(12) United States Patent
Tanaka et al.

(10) Patent No.: US 7,868,944 B2
(45) Date of Patent: Jan. 11, 2011

(54) CONTROL UNIT FOR OPTICAL APPARATUS AND IMAGE PICKUP APPARATUS

(75) Inventors: Kentaro Tanaka, Kawasaki (JP); Jun Nozaki, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 11/054,406

(22) Filed: Feb. 9, 2005

(65) Prior Publication Data
US 2005/0174466 A1 Aug. 11, 2005

(30) Foreign Application Priority Data

Feb. 9, 2004 (JP) ............................. 2004-032231
Feb. 9, 2004 (JP) ............................. 2004-032642

(51) Int. Cl.
- H04N 5/222 (2006.01)
- H04N 5/232 (2006.01)
- G03B 13/00 (2006.01)
- G03B 17/00 (2006.01)
- G03B 15/03 (2006.01)

(52) U.S. Cl. ....................... 348/371; 348/370; 348/345; 396/55; 396/177

(58) Field of Classification Search ................. 348/370, 348/371, 345–357; 396/65–70, 72–88, 177
See application file for complete search history.

(56) References Cited

U.S. PATENT DOCUMENTS 5,047,796 A * 9/1991 Tagami et al. ............... 396/132
5,448,331 A * 9/1995 Hamada et al. ............. 396/106
5,915,133 A * 6/1999 Hirai et al. .................... 396/48

(Continued)

FOREIGN PATENT DOCUMENTS

JP 62-135815 B 6/1987

(Continued)

OTHER PUBLICATIONS

The above references were cited in a May 30, 2008 Chinese Office Action issued in the counterpart Chinese Patent Application 200510005949.1.

(Continued)

*Primary Examiner*—Sinh Tran
*Assistant Examiner*—Christopher K Peterson
(74) *Attorney, Agent, or Firm*—Cowan, Liebowitz & Latman, P.C.

(57) ABSTRACT

There is provided a control unit of an optical apparatus and an image pickup apparatus, which can prevent a shift of an already controlled position of a member when an impact, etc. apply to the optical apparatus. A control unit for an optical apparatus that includes a first member that is movable, an actuator, and a drive mechanism that transmits a driving force of the actuator to the first member, includes a determination part for determining whether the optical apparatus or a second member provided to an apparatus attached to the optical apparatus is to move, and a controller for controlling, prior to a movement of the second member, the actuator from a first state at which the drive mechanism can transmit the driving force to a second state at which the drive mechanism cannot transmit the driving force, when the determination part determines that the second member is to move.

7 Claims, 19 Drawing Sheets

U.S. PATENT DOCUMENTS

| | | | |
|---|---|---|---|
| 6,661,460 B1 * | 12/2003 | Higuchi | 348/333.08 |
| 6,850,703 B2 * | 2/2005 | Miyazaki et al. | 396/177 |
| 6,856,345 B1 * | 2/2005 | Yamamoto et al. | 348/207.2 |
| 7,071,984 B2 * | 7/2006 | Kawakami | 348/315 |
| 2004/0136704 A1 * | 7/2004 | Usui | 396/55 |

FOREIGN PATENT DOCUMENTS

| | | | |
|---|---|---|---|
| JP | 62-246023 A | 10/1987 | |
| JP | 09-005843 A | 1/1997 | |
| JP | 2001-008074 A | 1/2001 | |
| JP | 2003-189135 A | 7/2003 | |
| JP | 2003-322788 A | 11/2003 | |

OTHER PUBLICATIONS

The above references were cited in a Mar. 2, 2010 Japanese Office Action, that issued in Japanese Patent Application No. 2004-032642.
The above references were cited in a Apr. 28, 2010 Japanese Office Action, that issued in Japanese Patent Application No. 2004-032231.

* cited by examiner

CONTROL UNIT FOR OPTICAL APPARATUS AND IMAGE PICKUP APPARATUS

BACKGROUND OF THE INVENTION

The present invention relates to an optical apparatus, such as an image pickup apparatus and an interchangeable lens.

The conventional optical apparatus, such as a digital camera, moves a focus lens to a focused position in accordance with a distance measuring or focus detecting result, and takes a picture using an image pickup device after the imaging optical system is in a focused state.

Any impacts upon the camera after the imaging optical system is set to a focused state may possibly reposition the focus lens and cause defocusing. The above impacts may possibly shift positions of one or more lenses in the imaging or viewfinder optical system, and may possibly change a shooting angle of view and a viewfinder's angle of view.

In a conventional digital still camera, a half-press of a release button starts the distance measurement, focusing and photometry. Whether a flash unit as a light emitting unit is to emit the light or not is determined based on the photometric result. When it is determined that the flash unit should emit the light, the flash unit accommodated in the camera is automatically popped up to a projecting position.

In general, the pop-up is so fast in a pup-up type flash unit that a mechanical impact applies to the camera during the pup-up time. Therefore, the vibration may possibly change the lens position as discussed above.

BRIEF SUMMARY OF THE INVENTION

Accordingly, it is one of the objects of the present invention to provide a control unit of an optical apparatus and an image pickup apparatus, which can prevent a shift of an already controlled position of a member when an impact, etc. apply to the optical apparatus.

A control unit according to one aspect of the present invention for an optical apparatus that includes a first member that is movable, an actuator, and a drive mechanism that transmits a driving force of the actuator to the first member, includes a determination part for determining whether the optical apparatus or a second member provided to an apparatus attached to the optical apparatus is to move, and a controller for controlling, prior to a movement of the second member, the actuator from a first state at which the drive mechanism can transmit the driving force to a second state at which the drive mechanism cannot transmit the driving force, when the determination part determines that the second member is to move.

A control unit according to another aspect of the present invention for an optical apparatus that includes a first member that is movable, includes a determination part for determining whether the optical apparatus or a second member provided to an apparatus attached to the optical apparatus is to move, and a controller for controlling movements of first and second members, wherein the controller controls the movement of the second member prior to controlling of the movement of the first member, when the controller attempts to control the movement of the first member and the determination part determines that the second member is to move.

Other objects and further features of the present invention will become readily apparent from the following description of the preferred embodiments with reference to accompanying drawings.

DETAILED DESCRIPTION OF THE PREFERRED EMBODIMENTS

A description will be given of the preferred embodiments of the present invention with reference to the accompanying drawings.

First Embodiment

Figure 13:
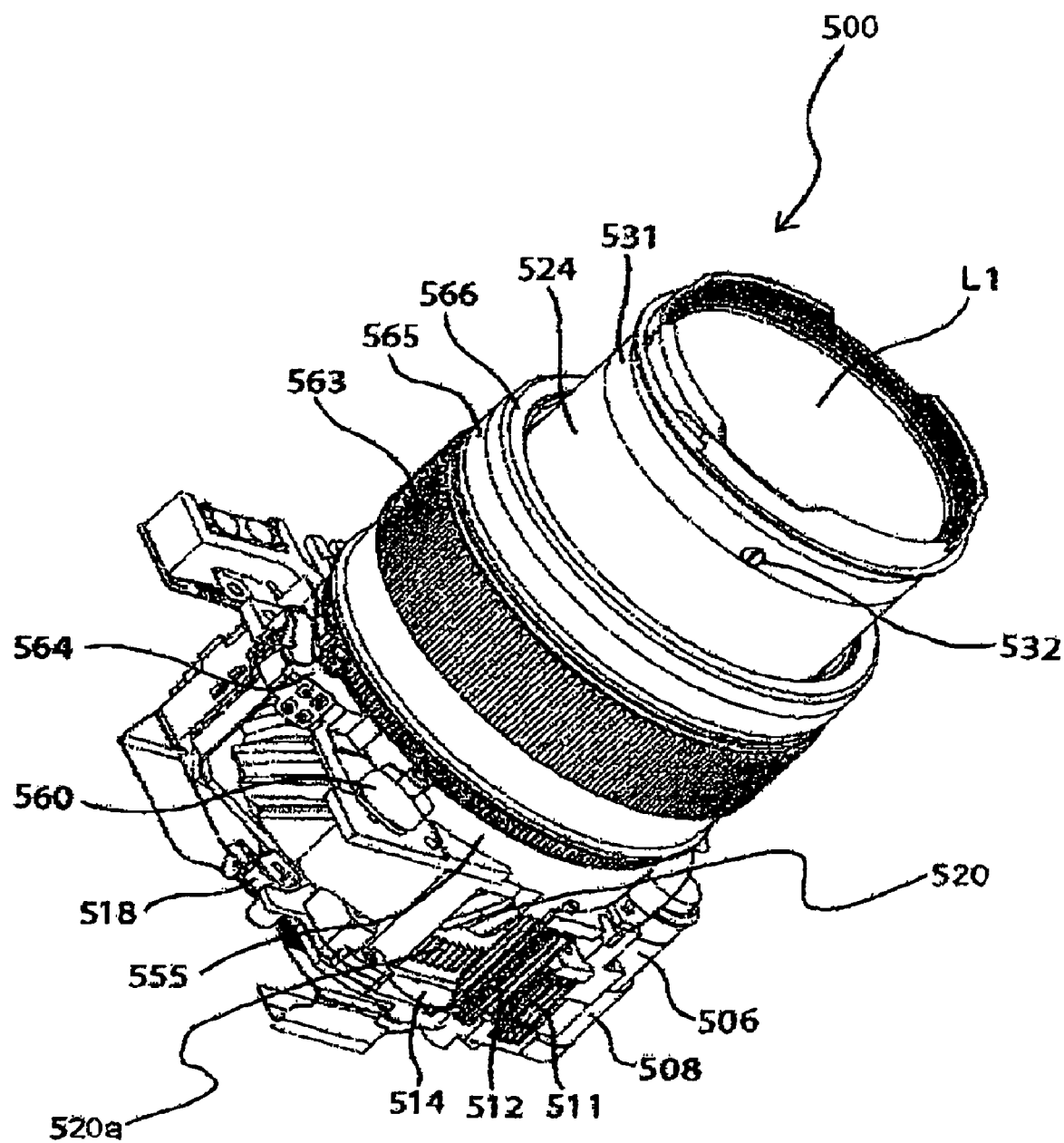
FIG. 13 is a perspective overview of a tens barrel.
Figure 14:
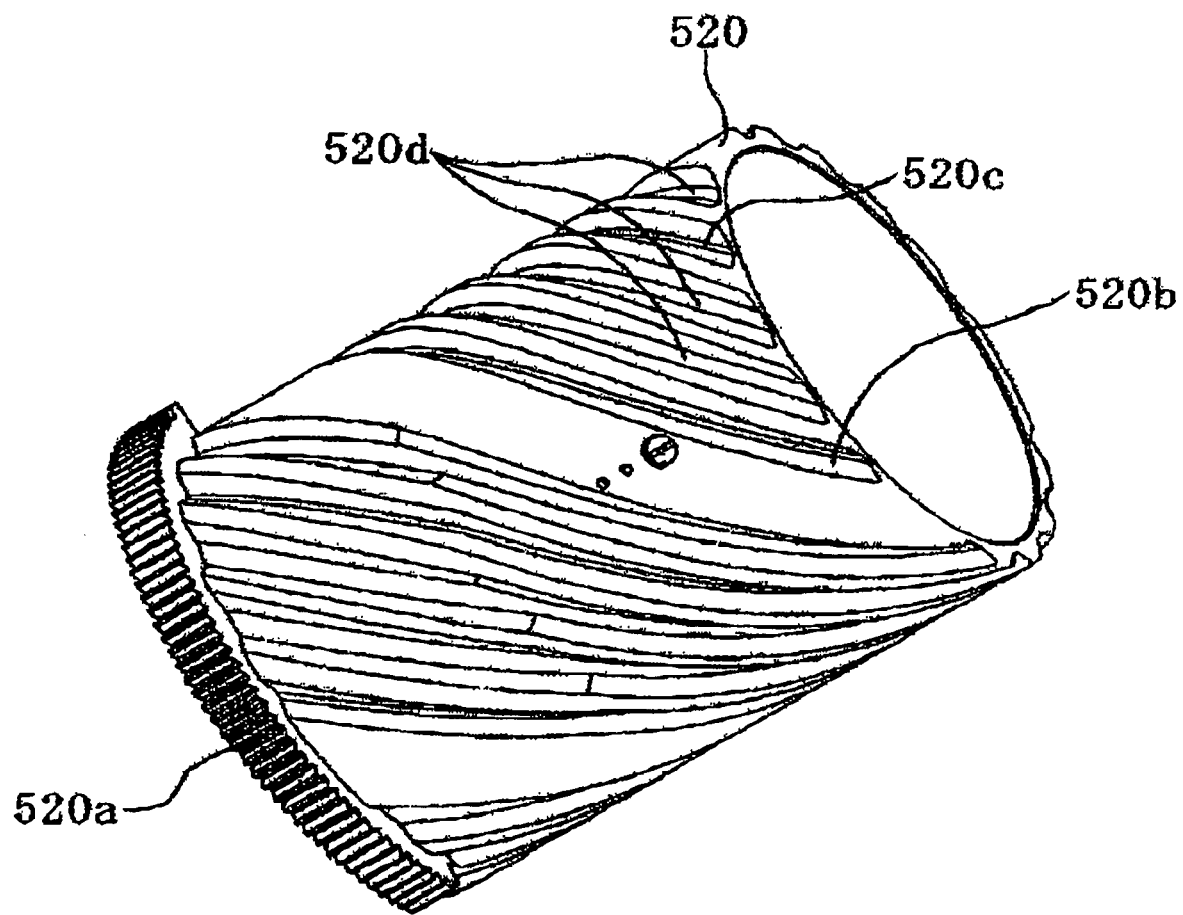
FIG. 14 is a perspective overview of a cam cylinder.

FIG. 13 is a perspective view of a lens barrel at a wide angle state, viewed from its front lower left, which lens barrel is provided in a camera according to a first embodiment of the present invention. FIG. 14 is a perspective view of the cam cylinder provided in the lens barrel, viewed from its front lower left.

A lens barrel 500 in a camera of this embodiment has, as shown in FIG. 13, an outer fixing barrel 555. The outer fixing barrel 555 includes a lens driving motor 506 as a drive source of the lens barrel 500, a motor cover 508, a slip 511, a final gear 512, a potentiometer, a potentiometric gear 514, a pulsed plate, an encoder cover, and a reset photointerrupter 518.

The lens barrel 500 further includes a cam cylinder 520, a first barrel 524 that holds a first lens unit L1 in an imaging optical system, a second barrel that holds a second lens unit (not shown), a third barrel that holds a third lens unit, and a fourth barrel that holds a fourth lens unit.

The lens barrel 500 further includes an outer fixing barrel bayonet button 560, an outer fixing barrel bayonet lock member, an operation ring 563 for manual operations, an operation ring encoder 564, an outer fixing barrel bayonet cover 565, and an outer fixing barrel bayonet cover cap 566. The first barrel 524 includes a first bayonet ring 531 and a first bayonet screw 532.

The cam cylinder 520 includes, as shown in FIG. 14, a gear member 520a engageable with the final gear 512, a first cam groove 520b, a first auxiliary pin groove 520c, and a first helicoids groove 520d. The cam cylinder 520 further includes second, third and fourth grooves (not shown).

In the above structure, the cam cylinder 520 rotates around the optical axis when receiving a driving force from the lens driving motor 506 via the above slip 511, the final gear 512, etc. Since the cam cylinder 520 is engaged with the outer fixing barrel 555 via the first helicoids groove 520d, the cam cylinder 520 moves in the optical-axis direction when rotating around the optical axis. Thereby, the lens barrel 500 (the first barrel 524, etc.) moves in the optical-axis direction, changes the focal distance of the imaging optical system, and provides a focusing action.

Figure 1:
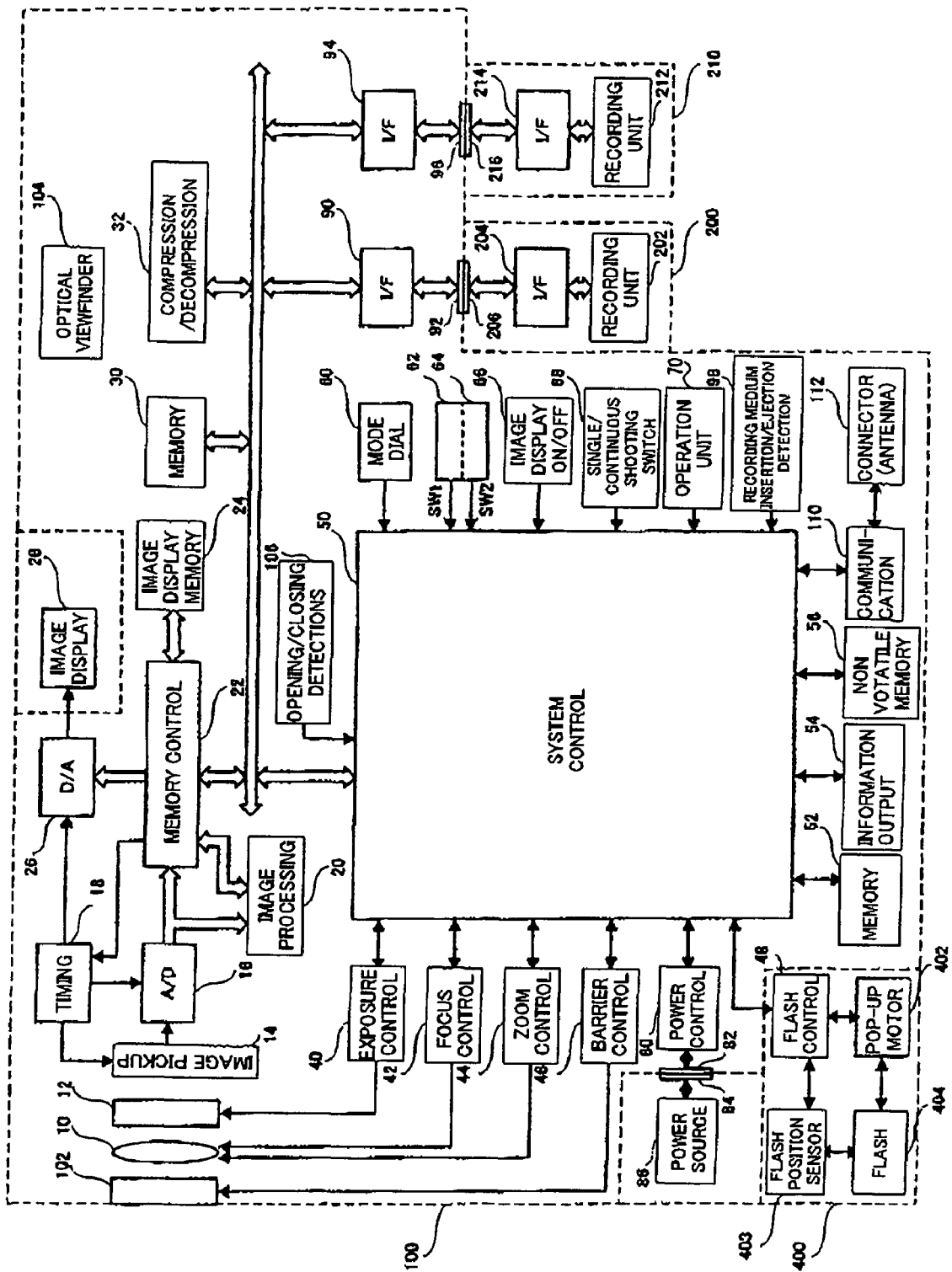
FIG. 1 is a block diagram of a structure of a camera according to a first embodiment of the present invention.

FIG. 1 shows a structure of the camera according to the present invention.

In FIG. 1, 100 denotes a camera. 10 denotes an image pickup lens. 12 denotes a shutter. 14 denotes an image pickup device that converts an optical image into an electric signal, such as a CCD sensor and a CMOS sensor. 16 denotes an A/D converter that converts an analog signal output from the image pickup device 14 to a digital signal. While FIG. 1 shows one lens as the image pickup lens 10, the camera 100 actually has a plurality of lenses, such as a focus lens and a zooming lens.

18 denotes a timing generating circuit that supplies a clock signal and a control signal to the image pickup device 14, the A/D converter 16 and the D/A converter 26, and is controlled by a memory control circuit 22 and a system control circuit 50.

20 denotes an image processing circuits which provides a predetermined pixel interpolation process and a color conversion process for data output from the A/D converter 16 or memory control circuit 22. The image processing circuit 20 provides a predetermined operation for the shot image data, and the system control circuit 50 controls an exposure control circuit 40 and a focus control circuit 42 based on an obtained operation result for a through the taking-lens ("TTL") autofocus ("AF") process, an automatic exposure ("AE") process, and a flash pre-emission ("EF") process.

The image processing circuit 20 provides a predetermined operating process using the photographed image data, and TTL automatic white balance ("AWB") process based on the obtained operating result.

22 denotes a memory control circuit, and controls actions of the A/D converter 16, the timing generating circuit 18, the image processing circuit 20, the image display memory 24, the D/A converter 26, the memory 30, the compression/decompression circuit 32. The output data from the A/D converter 16 is written down in the image display memory 24 or the memory 30 via the image processing circuit 20 and the memory control circuit 22 or only via the memory control circuit 22.

24 denotes the image display memory, 26 denotes the D/A converter, and 28 denotes the image display unit that includes a TFT_LCD, etc. The image data to be displayed written in the image display memory 24 is output to the image display unit 28 via the D/A converter 26, and displayed on the image display unit 28.

The image display unit 28 can serve as an electronic viewfinder when sequentially displaying the image data acquired by using the image pickup device 14. The image display unit 28 switches between a display state and a non-display state under control of the system control circuit 50. The image display unit 28 in the non-display state needs no driving power, remarkably reducing the power consumption of the camera 100.

The image display unit 28 is connected to the camera 100 via a rotatable hinge, and thus its display surface can face various directions. Thereby, the image display unit 28 provides the electronic viewfinder function, the reproduction display function, and various other display functions while its display surface faces an easily viewable direction for a user etc.

The image display unit 28 can be housed while its display surface faces the camera 100. When the image display unit 28 is housed, the system control circuit 50 detects the accommodation state of the image display unit 28 based on an output of an open/close detecting circuit 106 and stops the display action of the image display unit 28, preventing unnecessary displays on the image display unit 28 for the power saving of the camera 100.

30 denotes a memory that stores static image data and motion picture data, with a storage capacity enough to store a predetermined number of static image data and a predetermined time period of motion picture data. Thereby, the high-speed and a large amount of image storages in the memory 30 can be implemented even for the continuous shooting of the plural image data and the panoramic photography.

32 is a compression/decompression circuit that compresses or decompresses the image data by the adaptive discrete cosine transformation ("ADCT") etc., reads the image data stored in the memory 30 for compressions or decompressions, and writes down the processed data in the memory 30.

40 denotes an exposure control circuit that controls the driving of the shutter 12 that has a stop function. An association between driving of the shutter 12 and driving of the flash unit 404 provides a flash dimming action. 42a denotes a focus driving motor that drives a focus lens in the image pickup lens 10 via a driving force transmission 42b. 42 denotes a focus control circuit that drives the focus driving motor 42a based on the control signal from the system control circuit 50 that serves as a determination part and a controller as described later.

The system control circuit 50 controls driving of the exposure control circuit 40 and the focus control circuit 42 in the TTL manner. In other words, the system control circuit 50 outputs a control signal to the exposure control circuit 40 and the focus control circuit 42 based on the operation result by the image processing circuit 20 to the shot image data.

44a denotes a zoom driving motor that drives a zoom lens in the image pickup lens 10 via the driving force transmission 44b, and 44 denotes a zoom control circuit that drives the zoom driving motor 44a based on the control signal from the system control circuit 50. 46 denotes a barrier control circuit that controls actions of a barrier unit 102 that opens and closes a front surface of the image pickup lens 10. The system control circuit 50 controls driving of these control circuits 44 and 46.

50 denotes the system control circuit that controls the entire actions of the camera 100. 52 denotes the memory that stores the constants, variables and programs etc. used for operations of the system control circuit 50.

54 denotes an information output unit, which includes a liquid crystal display unit that displays the camera's operating state, messages etc. using the letters, images, etc. in accordance with the execution of the program by the system control circuit 50, and a speaker that outputs voices representative of information relating to the operating state. The information output unit 54 includes, for example, a combination of an LCD, an LED, a sound emitting device, etc. One or more information output units 54 are provided near an operation member in the camera 100 at a position easily viewable by the user.

The optical viewfinder 104 also display part of the display contents of the information output unit 54. The optical viewfinder 104 is connected to the image pickup lens 10 via the association mechanism (not shown), and a viewfinder lens moves in the optical-axis direction in the optical viewfinder 104 as the image pickup lens 10 moves in the optical-axis direction. Thereby, the optical viewfinder 104 zooms according to the zooming of the imaging optical system. A photographer can confirm a change of shooting view angle.

The LCD etc. display the single/continuous shot, a self-timer, a compressibility, a recording pixel number, a recording number, a shot number residue, a shutter speed, a stop value, an exposure compensation, a flash activation, a red-eye reduction, a macro shooting, a buzzer setting, a clock battery residue, a battery residue, an error, information expressed by plural figures of numerals, insertion/ejection statuses of recording media 200 and 210, and communication I/F actions, date and time, etc. among the display contents of the information output unit 54.

The optical viewfinder 104 displays the in-focus, warning of image unstableness, flash charging, shutter speed, stop value, exposure compensation, etc. among the display contents of the information output unit 54.

56 denotes a nonvolatile memory that can electrically erase and record information, such as an EEPROM.

60, 62, 64, 66, 68 and 70 denote operation units that input a variety of operational instructions into the system control circuit 50, and includes a pointing device, a voice recognition unit, etc. that utilize a switch, a dial, a touch panel, a line of sight detection, and an arbitrary combination thereof.

A description will now be given of each operation unit.

60 denotes a mode dial switch, and is manipulated so as to switch a variety of functional modes that include a power off, an automatic shooting mode, a manual shooting mode, a panoramic shooting mode, a reproduction mode, a multi-screen reproduction and deletion modes, a PC connection mode, etc.

62 denotes a shutter switch (SW1), which turns on in response to a semi-press (first stroke action) of the shutter button (not shown) on the camera 100, and instructs a start of actions, such as AF, AE, AWB, EF etc.

The AF moves the focus lens in the lens barrel moves to the focused position. When it is determined that the flash unit 404 should emit in the EF and the flash unit 404 has not yet popped up (or moved to the light emitting position), the system control circuit 50 instructs the flash control circuit 48 to pop up the flash unit 404. Thereby, the flash control circuit 48 drives the pop-up motor 402, and pops up the flash unit 404.

Vibrations occur in the camera body 100 by the pop-up action by the flash unit 404 and might possibly shift a position of the image pickup lens 10 (such as a focus lens and a zoom lens) in the optical-axis direction.

Accordingly, this embodiment enables the system control circuit 50 to control driving of the focus control circuit 42 and the zoom control circuit 44 before the pop-up of the flash unit 404, as described later so that the vibrations do not transmit to the image pickup lens 10 during the flash pop-up time. In other words, control over driving of the focus driving motor 42*a* and the zoom driving motor 44*a* as drive sources maintains a disengagement between the gears in the driving force transmissions 42*b* and 44*b* that transmit the driving forces to the focus lens and zoom lens in the image pickup lens 10 or provides in other words a driving force non-transmittable state.

The system control circuit 50 instructs the flash control circuit 48 to pop up the flash unit 404 after the controls over these motors finish. Thereby, the flash unit 404 housed in the camera body 100 at the accommodation position pops up to the light emitting position.

The system control circuit 50 controls driving of the focus and zoom driving motors 42*a* and 44*a* after the pop-up of the flash unit 404, and returns the driving force transmission to the original state or the driving force transmittable state (where the gears are engaged with each other).

This operation prevents the vibrations associated with the pop-up of the flash unit 404 from transmitting to the image pickup lens 10, and from repositioning the focus lens and the zoom lens. A detailed description of this operation will be described later with reference to FIGS. 9 and 10.

64 denotes a shutter switch (SW2), which turns on in response to the full press of the shutter button, and commands a shooting start. The shooting process includes an exposure that writes down a signal read out from the image pickup device 14 in the memory 30 via the A/D converter 16 and the memory control circuit 22, a development that uses operations at the image processing circuit 20 and the memory control circuit 22, and a recording that compresses the image data read out from the memory 30 in the compression/decompression circuit 32 and writes it down in the recording media 200 and 210.

66 denotes an image display ON/OFF switch, which switches the image display unit 28 between the display state and the non-display state. In shooting with the optical viewfinder in the camera 100, the power of the camera 100 can be saved by turning off the current supply to thee image display unit 28 so as to make it into the non-display state.

68 denotes a single/continuous shooting switch, and designates a single shooting mode or a continuous shooting mode. The single shooting mode provides each shooting whenever the shutter switch 64 turns on, and then shifts to the standby state. The continuous shooting mode provides plural continuous shootings when the shutter switch 64 turns on.

70 denotes an operation unit that includes a touch panel and various buttons, such as a menu button, a set button, a macro button, a multi-screen reproduction page break button, a flash setting button, a single/continuous/self-timer switching buttons a menu changing + (plus) button, a menu changing − (minus) button, a reproduced image changing + (plus) button, a reproduced image changing − (minus) button, a shooting image quality selecting button, an exposure compensation button, a data/time setting button, a selection/switch button used to select and switch various functions when shooting and reproduction are executed, such as a panoramic mode, an enter/execution button used to select and switch various functions when shooting and reproduction are executed, such as a panoramic mode, and a quick review ON/OFF switch used to set a quick review function that automatically reproduces the shot image data just after the shooting.

The operation unit 70 further includes a compression mode switch as a switch for selecting a compressibility of the JPEG compression or a RAW mode that digitizes a signal of the image pickup device and records it in a recording medium, a reproduction mode switch that sets various functional modes, such as a reproduction mode, a multi-screen reproduction, a deletion mode, and a PC connection mode, a reproduction switch that commands a start of the reproduction that reads out the shot image data from the memory 30 or the recording media 200 and 210 and displays the image data on the image display unit 28 in the shooting mode., and other switches.

80 denotes a power control unit, and includes a battery detecting circuit, a DC-DC converter, and a switch circuit that switches a block to be electrified. The power control unit 80 detects whether the battery is attached, a type of the battery, and the battery residue, controls the DC-DC converter based on the detection result and the instruction by the system control circuit 50, and supplies a necessary voltage to each circuit in the camera 100 including the recording medium for a necessary time period.

82 denotes a connector at the side of the battery control unit 80, and 84 denotes a connector at the side of the battery unit 86, which is a battery unit that includes a primary battery such as an alkali battery and a lithium-ion battery, and a secondary battery such as a NiCd battery, a NiMH battery, and a Li battery, an AC adapter, etc.

90 and 94 denote interfaces with recording media, such as a memory card and a hard disc, and 92 and 96 denote a connector to be connected to the recording media. 98 denotes a recording medium insertion/ejection detecting circuit that detects whether the recording media 200 and 210 are attached to the connectors 92 and 96.

While this embodiment has two systems of interfaces and connectors attached to the recording medium, the number of interfaces and connectors attached to the recording medium and the number of systems may be arbitrary. Types of the interface and connectors are also arbitrary.

The interface and connector can use the standardized types, such as PCMCIA cards and CF® (compact flash) card. When the interfaces 90 and 94 and connectors 92 and 96 use the standardized types, such as PCMCIA cards and CF® (compact flash) card, image data and associated control information can be transferred between another computer and a peripheral, such as a printer, by connecting various communication cards, such as a LAN card, a MODEM card, a USB card, an IEEE1394 card, a P1284 card, a SCSI card, and a PHS card.

102 denotes a barrier unit that opens and closes a front surface of the image pickup lens 10, and protects the front surface of the image pickup lens 10 from contamination and damages. 106 denotes an open/close detecting circuit that detects whether or not the image display unit 28 is accommodated.

110 denotes a communication circuit including a variety of communication functions, such as RS232C, USB, IEEE1394, P1284, SCSI, a modem, LAN, and a wireless communication. 112 denotes a connecter that connects the camera 110 to another apparatus, or an antenna in case of the wireless communication.

200 and 210 denote recording media, such as a memory card and a hard disc. The recording media 200 and 210 are recording units 202 and 212 that include a semiconductor memory, a magnetic disc, etc., interfaces 204 and 214 with the camera 100, and connectors 206 and 216 connected to the connectors 92 and 96 in the camera 100.

400 denotes a flash apparatus. The flash apparatus 400 includes a flash control circuit 48, a flash position sensor, a pop-up motor 402, and a flash unit 404. The flash unit 404 is movable between the light emitting position and the accommodation position at which it is housed in the camera 100.

The flash control circuit 48 detects, based on an output of the flash position sensor 403, whether the flash unit 404 is in a pop-up state (i.e., at a light emitting position or an accommodation position), when the system control circuit 50 instructs the flash control circuit 48 to send information relating to the pop-up state of the flash unit 404 to the system control circuit 50. In response, the flash control circuit 48 sends a detection result to the system control circuit 50.

The flash control circuit 48 drives the pop-up motor 402 and moves the flash unit 404 when the system control circuit 50 instructs the flash control circuit 48 to pop up the flash unit 404. The flash unit 404 serves to project the AF auxiliary light and dim the flash.

Referring to FIGS. 2A to 8, a description will be given of the operation of the camera according to this embodiment. Here, FIG. 2A to 4B are flowcharts of a main routine of the camera of this embodiment. In these figures, parts with the similarly circled numeral are connected to each other, and "S" means an abbreviation of "step".

Figure 2A:
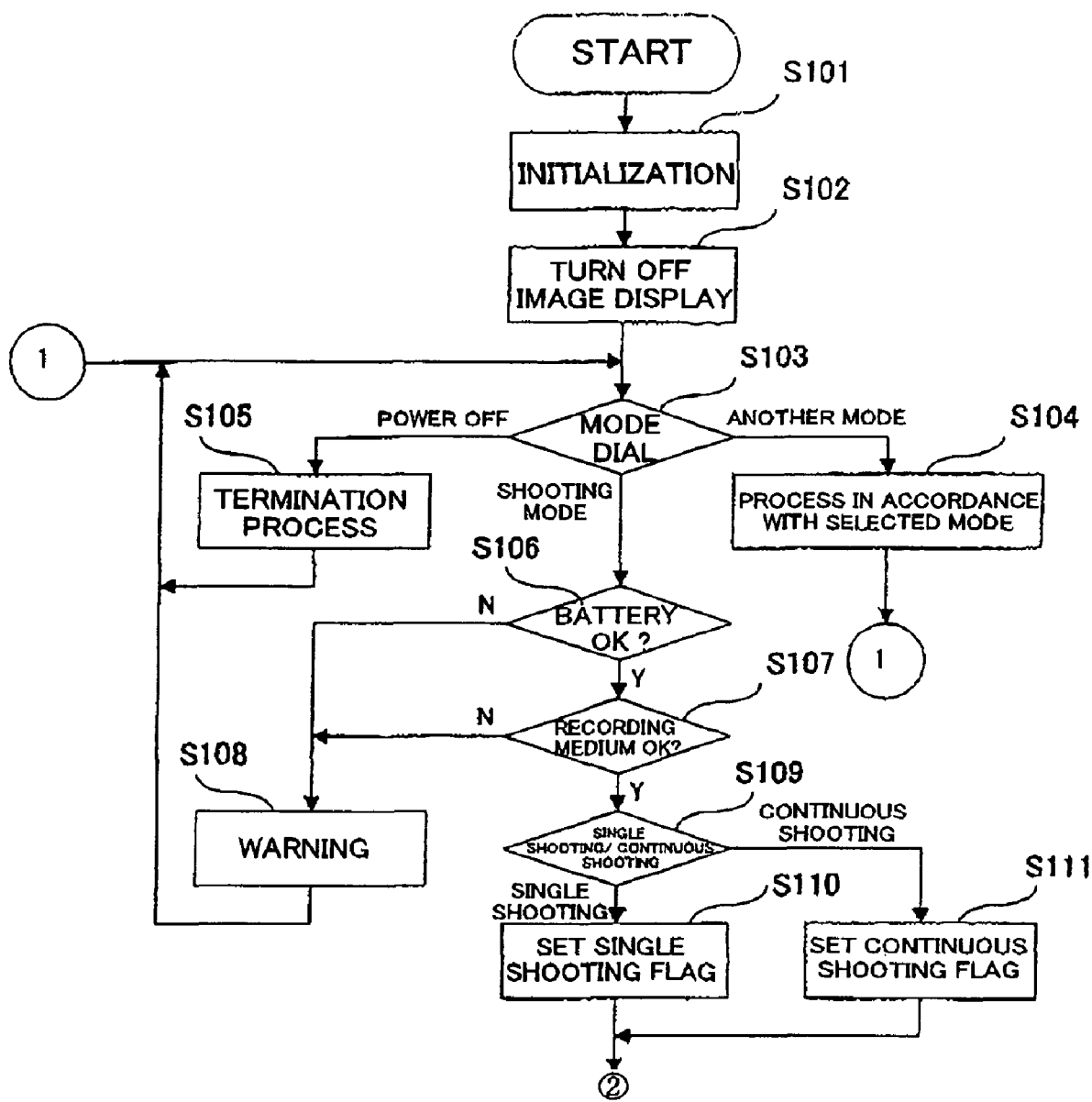
FIGS. 2A and 2B are flowcharts showing a main routine of the camera according to the first embodiment.
Figure 2B:
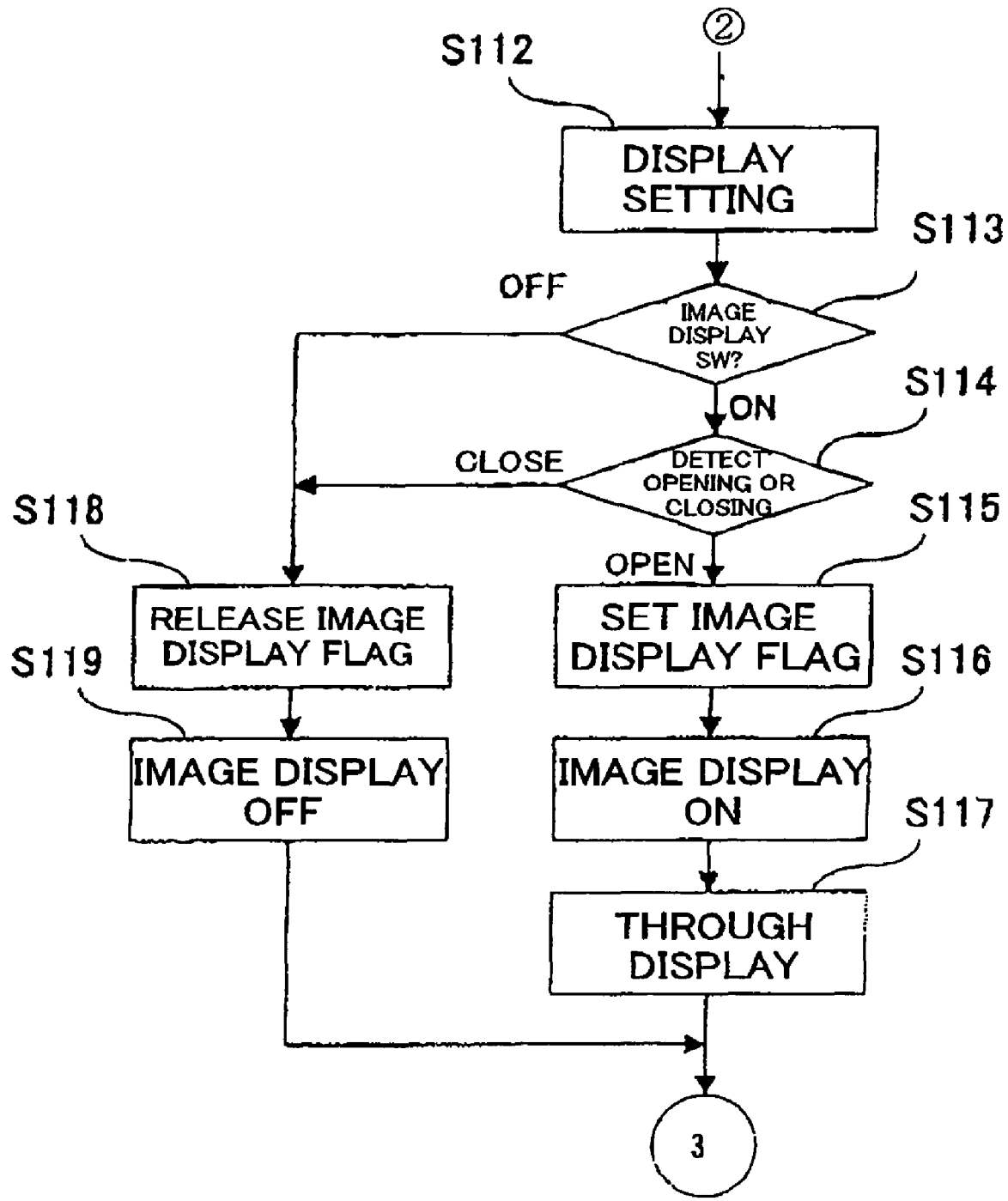

In FIGS. 2A and 2B, in response to a projection of the power, such as a replacement of the battery, the system control circuit 50 initializes the flag and control variables (S101), and the image display unit 28 to the non-display state (S102).

The system control circuit 50 determines a set position of a mode dial 60 (step S103). When the mode dial 60 sets "power off", the termination process for the camera action follows (step S105). More specifically, each display unit in the camera 100 is turned to the non-display state, the barrier unit 102 is driven so as to cover the front surface of the image pickup lens 10, necessary parameters and set values and set modes that include a flag, a control variable, etc. are recorded in the nonvolatile memory 56, and the unnecessary power supply to the image display unit 28 etc. ends under control of the power control unit 80. Then, the procedure returns to the step 103.

On the other hand, when the mode dial 60 sets a "shooting mode" (S103), the procedure moves to a step 106. When the mode dial 60 sets another mode (S103), the system control circuit 50 executes a process in accordance with the selected mode (S104), and returns to a step 103 after the process.

In step 106, the system control circuit 50 determines, via the power control unit 80, whether the residue of the power source 86 that includes a battery etc., and the operational status of the power source 86 are problematic to the operation of the camera 100. When there is a problem, the procedure returns to the step 103, after the information output unit 54 warns user through an image and sound (S108).

On the other hand, when there is no problem (S106), the system control circuit 50 determines whether the operational states of the recording media 200 and 210 are problematic to the operation of the camera 100, in particular, the recording and reproducing actions of image data to the recording media 200 and 210 (S107). When the recording media 200 and 210 are problematic, the procedure returns to the step 103, after the information output unit 54 warns the user through an image and sound (S108). On the other hand, when the recording media 200 and 210 are not problematic (S107), the procedure moves to a step 109.

The system control circuit 50 determines a set status of the single/continuous switch 68 that sets the single shooting mode or the continuous shooting mode (S109). When the single shooting mode is set, the single/continuous shooting flag is set to the single shooting (S110); when the continuous shooting mode is set, the single/continuous shooting flag is set to the continuous shooting (S111). After the setting of each flag ends, the procedure moves to the step 112.

The single shooting mode provides one shot whenever the shutter switch 64 (SW2) is pressed, and then turns to the standby mode. The continuous shooting mode provides plural continuous shootings while the shutter switch 64 (SW2) is pressed. On the other hand, the memory in the system control circuit 50 or the memory 52 stores a status of the single/continuous shooting flag.

The system control circuit 50 outputs information relating to various setting statuses of the camera 100 through an image or sound (S112). When the image display unit 28 is in the display state, the image display unit 28 displays various set statuses of the camera 100.

Then, the system control circuit 50 determines the set status of an image display ON/OFF switch 66 (S113), and moves to S114 when the image display state (ON state) is set.

The system control circuit 50 determines, based on the output from the open/close detecting circuit 106, whether the image display unit 28 is in the storage state or the display state (at which the image display unit 28 projects from the camera) (S114). When determining that it is in the display state, the system control circuit 50 sets the image display flag (S115) and sets the image display unit 28 to the ON state (display state) (S116). Then, the system control circuit 50 sets a through display state that sequentially displays the shot image data (S117), and moves to the step 131 (FIG. 3).

The through display state outputs the data sequentially written down in the image display memory 24 via the image pickup device 14, the A/D converter 16, the image processing circuit 20 and the memory control circuit 22 to the image display unit 28 via the memory control circuit 22 and D/A converter 26. Thereby, the image display unit 28 sequentially displays the image, and serves as an electronic viewfinder.

The system control circuit 50 releases the image display flag (S118), when the image display ON/OFF switch 66 is set to the image display OFF (non-display state) (S113), or when determining, based on an output of the open/close detecting circuit 106, that the image display unit 28 is being stored (S114). The system control circuit 50 sets the image display in the image display unit 28 to the OFF state (non-display state) (step S119), and moves to the step 131.

Since the electronic finder function by the image display unit 28 does not work in the image display OFF, the shot needs the optical viewfinder 104, saving the consumption power of the image display unit 28 and the D/A converter 26 that has a large power consumption amount. The set state of the image display flag is stored in the memory in the system control circuit 50 or the memory 52.

Figure 3A:
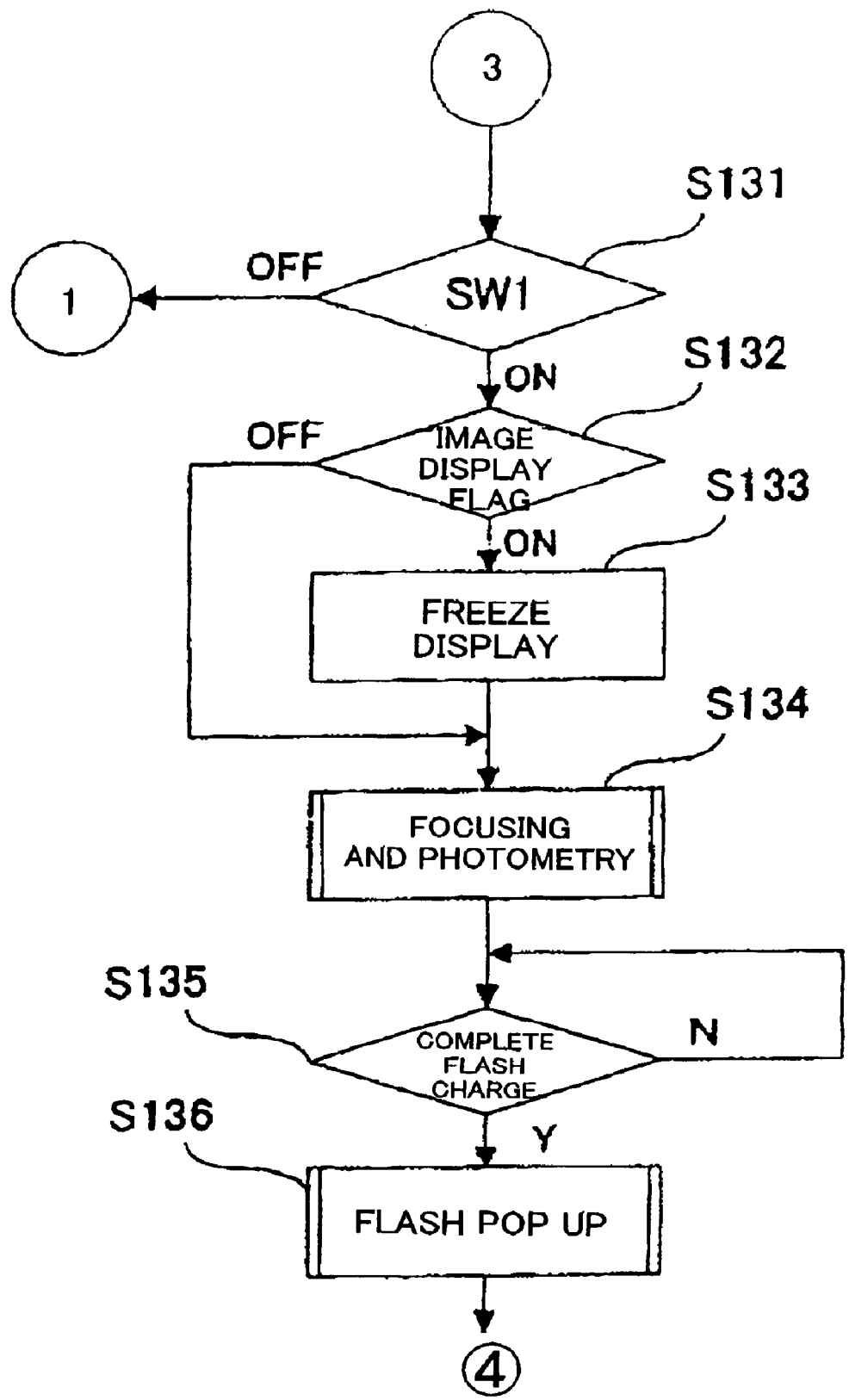
FIGS. 3A and 3B are flowcharts showing a main routine of the camera according to the first embodiment.
Figure 3B:
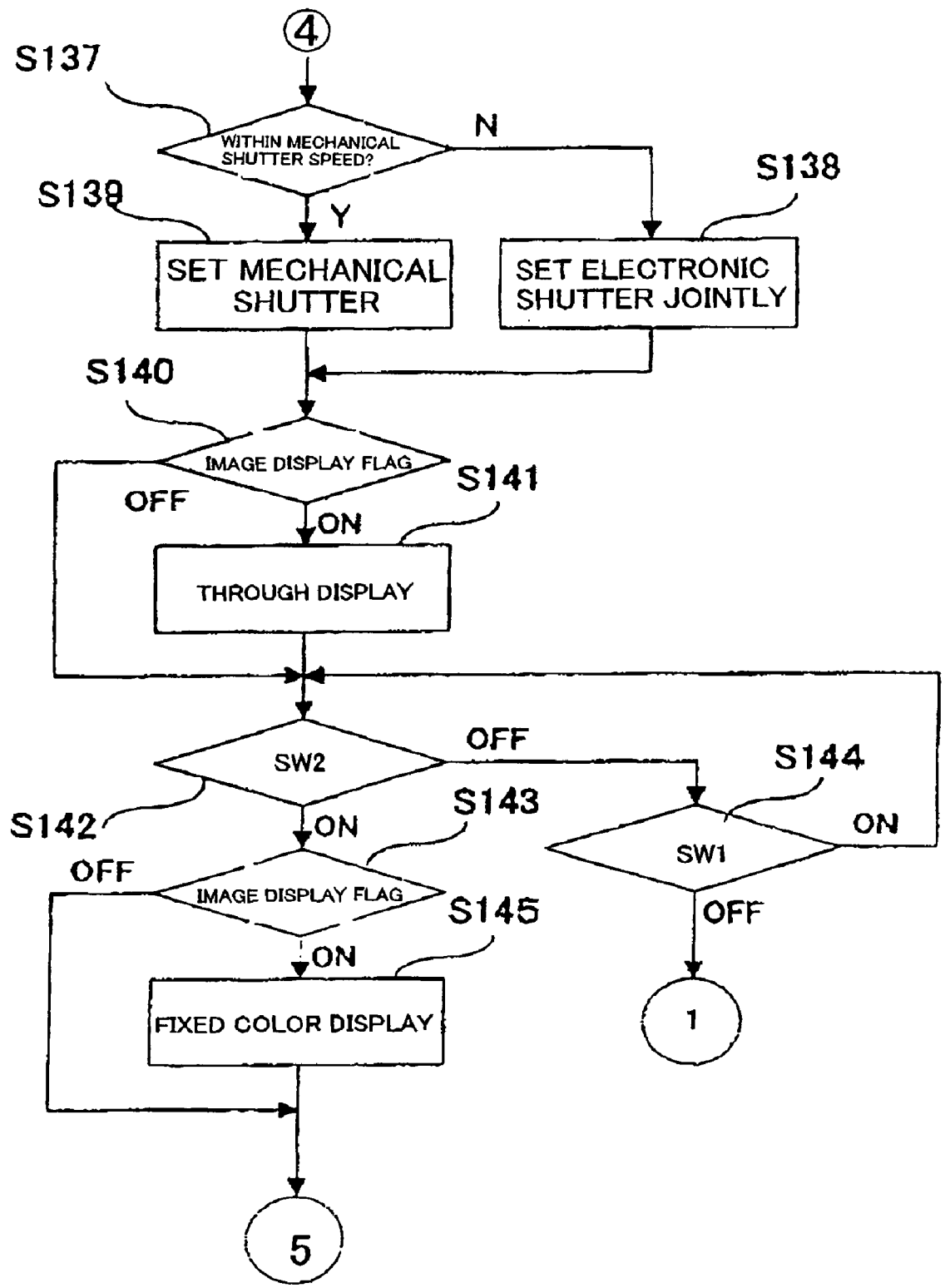

In the step 131 in FIG. 3A, the system control circuit 50 determines the ON/OFF state of the shutter switch 62 (SW1). The procedure returns to the step 103 when it is the OFF state. When the shutter switch 62 (SW1) is in the ON state (S131), the system control circuit 50 determines the image display flag stored in the memory in the system control circuit 50 or in the memory 52 (S132).

When the image display flag has been set, the display state of the image display unit 28 is set to the freeze display state (S133), and the procedure moves to the step 134.

The freeze display state prohibits rewriting of the image data in the image display memory 24 via the image pickup device 14, the A/D converter 16, the image processing circuit 20, and the memory control circuit 22. The image data that has been finally stored in the image display memory 24 is output to the image display unit 28 via the memory control circuit 22 and the D/A converter 26 so as to display it on the image display unit 28, thereby, the image display unit 28 displays frozen image.

On the other hand, when the image display flag is released in the step 132, the procedure moves to the step 134.

The system control circuit 50 moves the image pickup lens 10 (i.e., the focus lens) to the focused position by the focusing action, and determines the stop value and the shutter speed by the photometry action (S134). The system control unit 50 sets the flash when determining that the flash unit 404 should be used based on the photometric result. A detailed description will be given of the above focusing and photometric actions, with reference to FIG. 5.

After completing the focusing and photometric actions (S134), the system control circuit 50 checks a charge state of the flash unit 404 via the flash control circuit 48 (S135). When the flash unit 404 has not been charged, the system control circuit 50 confirms and waits for the completion of the charge (S135). When the charge of the flash unit 404 is completed, the procedure moves to the pop-up of the flash unit 404 (S136). A detailed description will be given of the pop-up of the flash unit 404 later, with reference to FIG. 9. This embodiment assumes that the system control circuit 50 determines that the flash unit 404 needs to emit the light in the photometric action.

In a step 137, the system control circuit 50 determines whether the shutter speed determined, based on the shooting mode set by an operation of the mode dial 60 and the exposure result obtained by the photometric action (S134), exceeds the maximum shutter speed in the (mechanical) shutter 12.

When it does not exceed the maximum shutter speed, the shutter speed in the shutter 12 is set (S139), and the procedure moves to the step 140. On the other hand, when it exceeds the maximum shutter speed, the shutter speed is set by using diving of the shutter 12 and the electronic shutter (driving of the image pickup device 14) (S139), and the procedure moves to the step 140.

When the shooting shutter speed exceeds the maximum (mechanical) shutter 12, the parallel use of the electronic shutter can prevent smears by the mechanical shutter, and the electronic shutter can maintain a high-speed shutter speed.

The system control circuit 50 determines a state of the image display flag in the memory in the system control circuit 50 or the memory 52 (S140), and sets the display state of the image display unit 28 to the through display state when the image display flag is set (S141). Then, the procedure moves to the step 142.

The step 142 checks the ON/OFF state of the shutter switch 64 (SW2). When the shutter switch 64 is in the OFF state, the system control circuit 50 checks the ON/OFF state of the shutter switch 62 (SW1) again, and when SW1 is in the OFF state, the procedure returns to the step 103. When SW1 is in the ON state, the procedure returns to a step 142.

When determining that the shutter switch 64 (SW2) is in the ON state (S142), the shutter control circuit 50 determines a state of the image display flag in the memory in the system control circuit 50 or the memory 52 (S143), and sets the display state of the image display unit 28 to the fixed color display state when the image display flag is set (S145), the procedure moves to the step 161. When the image display flag is not set, the procedure moves to a step 161.

The fixed color display state outputs the fixed color image data to the image display unit 28 via the memory control circuit 22 and the D/A converter 26, instead of the image data written down in the image display memory 24 via the image pickup device 14, the A/D converter 16, the image processing circuit 20, and the memory control circuit 22. Thereby, the image display unit 28 displays the fixed color image data (projected image).

In the step 161 (FIG. 4), the system control circuit 50 determines a state of the single/continuous shooting flag stored in the memory in the system control circuit 50 or the memory 52; the procedure moves to a step 162 when the single shooting flag is set, and to a step 181 when the continuous shooting flag is set.

The system control circuit 50 executes a shooting process in a step 162. More specifically, the exposure starts and writes the shot image data in the memory 30 via the image pickup device 14, the A/D converter 16, the image processing circuit 20 and the memory control circuit 22, or via the memory control circuit 22 directly from the A/D converter 16. The development follows and reads the image data written down in the memory 30 via the memory control circuit 22, and if necessary the image processing circuit 20, for various processes. A detailed description will be given of this shooting process, with reference to FIG. 6.

The system control circuit 50 determines a state of the image display flag stored in the memory in the system control circuit 50 or the memory 52 (S163). When the image display flag is set, a first quick review display follows. More specifically, the image data, which has been processed in accordance with the display format of the image display unit 28, is read from the memory 30, the image data to be displayed is transferred to the image display memory 24 via the memory control circuit 22, and the image display unit 28 displays the image data read from the image display memory 24.

Since the first quick review display process is prior to the dark capture process (S165), which will be described later, the image data to be displayed is prepared using the image data that has not yet experienced the dark correction operation, and the first quick review is displayed based on the image data to be displayed.

Thus, the single shooting mode executes the shooting process prior to the dark capture process, and uses the image data that has not yet experienced the dark correction as the image for the quick review display, shortening the shutter release time lag and providing the quick review display just after the shooting.

Since the first quick review display (S164) has not yet finished the dark capture process (S165), the image display unit 28 superimposes "busy" or another word on the quick review display.

On the other hand, when the system control circuit 50 determines that the image display flag is released in the step 163, the procedure moves to the step 165 while the image display unit 28 is turned to the OFF state. In this case, the image display unit 28 remains in the non-display state without quick review display even after the shooting. This is seen when the shooting continues with the optical viewfinder 104, and the shot image just after the shooting does not have to be confirmed on the image display unit 28.

The system control circuit 50 closes the shutter 12, accumulates the noises, such as a dark current of the image pickup device 14, for the same time period as that for the actual shooting, and conducts a process that reads an accumulated noise image signal (the dark capture process) (S165). The procedure then moves to the step 166.

The deterioration of the image quality, such as loss of pixels due to dark current noises generated in the image pickup device 14 and scratches in the image pickup device 14 is prevented through a correction operation process for the actually exposed and obtained image data using the dark image data taken in by the dark capture process. A detailed description will be given of this dark capture process (S165) with reference to FIG. 7.

The system control circuit 50 reads part of the image data in the predetermined area in the memory 30 via the memory control circuit 22, and provides a white balance ("WB") integration and an optical black ("OB") integration necessary for the development. The operational result is stored in the internal memory or the memory 52 (S166).

The system control circuit 50 reads the shot image data written in the predetermined area in the memory 30 using the memory control circuit 22 and if necessary the image processing circuit 20, and provides various developments such as the AWB process, the γ-conversion process, and color conversion process (S166).

The development performs a subtraction that uses the dark image data captured by the dark capture process, and the dark correction operation that cancels the dark current noises of the image pickup device 14, etc. A detailed description will be given of this development (S166) with reference to FIG. 8.

The system control circuit 50 reads out the image data written in the predetermined area in the memory 30, and provides the compression/decompression process at the compression/decompression circuit 32 in accordance with the preset mode (S167). The image data that has experienced the above series of processes is written in the vacant image storage buffer area in the memory 30.

The system control circuit 50 reads out the image data stored in the image storage buffer area in the memory 30, and writes (or records) the data in the recording media 200 and 210, such as the memory card and the CF® card, via the interfaces 90 and 94 and connectors 92 and 96 (S168).

While the image data is written in the recording media 200 and 210, the information output unit 54 is driven to express the ongoing writing action, informing a user through the blinking LED that the writing to the recording medium is now proceeding.

The system control circuit 50 determines a state of the image display flag stored in the internal memory or the memory 52 in a step 169. When the image display flag is set, the image data, which has been processed in accordance with the display format of the image display unit 28, is read out of the memory 30 and transferred to the image display memory 24 via the memory control circuit 22, and the image display unit 28 displays the image data read from the image display memory 24 (a second quick review display S170).

Since the second quick review display process follows after the dark capture process (S165), the development (S166) prepares image data for display using the image data after the dark correction operation, and the quick review display relies upon this image data.

Thus, the single shooting mode conducts the dark capture process prior to the shooting process, and the first quick review display using the image data that has not yet experienced the dark correction. The second quick review follows using the image data that has experienced the dark correction, after the dark capture process. This configuration provides a shorter shutter release time lag, and the (first) review display just after the shooting.

Since the second quick review display process (S170) follows after the dark capture process (S165), the image display unit 28 deletes "busy" or the other word superimposed onto the quick review display in the first quick review display (S164).

When the image display flag is released in the step 169, the image display unit 28 remains in the OFF state and the procedure moves to the step 171. In this case, the image display unit 28 remains in the OFF state without a quick review display even after the shooting. This is seen when the shot image does not have to be confirmed just after the shooting and the power saving is emphasized without the electronic viewfinder of the image display unit 28 as in the shooting continues with the optical viewfinder 104.

The step 171 stands by until the shutter switch 62 (SW1) turns to the OFF state, and the procedure moves to a step 172 when the shutter switch 62 turns to the ON state. When the shutter switch 62 (SW1) turns off, the second quick review display remains.

On the other hand, when the continuous shooting flag is set in the step 161 as a result of the determination of the state of the single/continuous shooting flag, the procedure moves to a step 181. In the step 181, the system control circuit 50 closes the shutter 12, accumulates the noises, such as a dark current of the image pickup device 14, for the same time period as that for the actual shooting, and conducts the dark capture process that reads an accumulated noise image signal (S181). The procedure then moves to the Step 182.

The shot image data is protected from the deterioration of the image quality, such as loss of pixels due to dark current noises generated in the image pickup device 14 and scratches in the image pickup device 14 through a correction operation process using the dark image data taken in by the dark capture process. A detailed description will be given of this dark capture process (S181) with reference to FIG. 7.

The system control circuit 50 executes a shooting process in the step 182. More specifically, the exposure starts and writes the shot image data in the memory 30 via the image pickup device 14, the A/D converter 16, the image processing circuit 20 and the memory control circuit 22, or via the memory control circuit 22 directly from the A/D converter 16. The development follows and reads the image data written down in the memory 30 via the memory control circuit 22, and if necessary the image processing circuit 20, for various processes. A detailed description will be given of this shooting process (S182), with reference to FIG. 6.

The system control circuit 50 provides a white balance ("WB") integration and an optical black ("OB") integration necessary for the development. The operational result is stored in the internal memory or the memory 52 (S183).

The system control circuit 50 reads the shot image data written in the predetermined area in the memory 30 using the memory control circuit 22 and if necessary the image processing circuit 20, and provides various developments such as the AWB process, the γ-conversion process, and color conversion process (S183).

The development performs a subtraction process that uses the dark image data taken in by the dark capture process, and the dark correction operation process that cancels the dark current noises of the image pickup device 14, etc. A detailed description will be given of this development (S183) with reference to FIG. 8.

The system control circuit 50 determines a state of the image display flag stored in the internal memory or the memory 52 (S184). When the image display flag is set, a third quick review display follows (S185). More specifically, the image data, which has been processed in accordance with the display format of the image display unit 28, is read out of the memory 30 and transferred to the image display memory 24 via the memory control circuit 22, and the image display unit 28 displays the image data read from the image display memory 24.

Since the third quick review display process follows after the dark capture process (S181), the development (S183) prepares image data for display using the image data after the dark correction operation, and the quick review display relies upon this image data.

Thus, the continuous shooting mode conducts the third quick review display using the image data that has experienced the dark correction, maintains intervals among continuous shooting shots approximately constant after the first and second shots, and conducts the quick review display just after the shooting.

When determining that the image display flag is released in the step 184, the system control circuit 50 remains the image display unit 28 in the OFF state and moves to the step 186. In this case, the image display unit 28 remains in the OFF state without a quick review display even after the shooting. This is seen when the shot image does not have to be confirmed just after the shooting and the power saving is emphasized without the electronic viewfinder of the image display unit 28 as in the shooting continues with the optical viewfinder 104.

The system control circuit 50 reads out the image data written in the predetermined area in the memory 30, and provides the compression/decompression process at the compression/decompression circuit 32 in accordance with the preset mode (S186).

The system control circuit 50 determines whether or not there is a vacant image storage buffer area in the memory 30 (S187), and sequentially writes the compressed image data when there is the vacant area. The procedure then moves to a step 189. On the other hand, when there is no vacant image storage buffer area in the memory 30 (S187), the system control circuit 50 reads out the image data stored in the image storage buffer area in the memory 30, and writes (or records) the data in the recording media 200 and 210, such as the memory card and the CF® card, via the interfaces 90 and 94 and connectors 92 and 96 (S188). Then procedure then moves to a step 189.

Thus, when the image storage buffer area runs short as a result of a predetermined number of continuous shots, the recording process creates a vacant image storage buffer area for resuming the consecutive shooting. The recording process in the step 188 can warn the user through the image display unit 28 and the information output unit 54 by an image or sounds, when there is no vacant area.

The system control circuit 50 checks an ON/OFF state of the shutter switch 64 (SW2) (S189), and returns to the step 182 to repeat a series of continuous shooting when it is in the ON state. On the other hand, when the shutter switch 64 (SW2) is in the OFF state (S189), the system control circuit 50 checks a status of the shutter switch 62 (SW1) (S190).

When the shutter switch 62 (SW1) is in the ON state (S190), the procedure moves to the step 189. On the other hand, if it is in the OFF state, the system control circuit 50 reads out the image data stored in the image storage buffer area in the memory 30, and writes (or records) the data in the recording media 200 and 210, such as the memory card and the CF® card, via the interfaces 90 and 94 and connectors 92 and 96 (S191).

While the image data is written in the recording media 200 and 210, the information output unit 54 is driven to express the ongoing writing action, informing a user, for example, through the blinking LED, that the writing to the recording medium (S191). After the recording process (S191), the procedure moves to the step 172.

In the step 172, the system control circuit 50 determines a status of the image display flag in the internal memory or the memory 52. The system control circuit 50 sets the display state of the image display unit 28 to the through display state (S173) when the image display flag is set (S172), the procedure moves to the step 103 after a series of shooting operation ends. In this case, after confirming the shot image on the image display unit 28, the system control circuit 50 can set the through display state that sequentially displays the shot image data for the next shooting.

On the other hand, when the image display flag is released (S172), the image display of the image display unit 28 is set to the OFF state (S173), and the procedure returns to the step 103 after a series of shooting operation.

FIGS. 5A and 5B are detailed flowcharts of the focusing and photometry process in the step 134 in FIG. 3.

A step 201 reads a charge accumulation signal (image data) from the image pickup device 14, and the image processing circuit 20 sequentially reads the image data via the A/D converter 16. The image processing circuit 20 conducts a predetermined operation used for the TTL AE, EF and AF processes using this sequentially read image data.

Each process cuts a necessary number of pixels of a specific part in accordance with the necessity among all the shot pixels, and extracts it for use with the operation. Thereby, an optimal operation is available for each of the AE, EF, AWB and AF processes and each of different modes including a center emphasized mode, an averaging mode, and an evaluation mode.

Until the system control circuit (determination means) 50 determines that the AE is proper using the operation result by the image processing circuit 20 (S202), the system control circuit 50 controls AE (or driving of the stop) using the exposure control circuit 40 (S203). The system control circuit 50 determines whether the flash unit 404 should emit or not using the measurement data obtained in the AE control (S204).

When the light emission of the flash unit 404 is necessary, the system control circuit 50 sets a flash flag and instructs the flash control circuit 48 to charge the flash unit 404 (S205). Thereby, the flash unit 404 is charged for emission.

When determining in the step 202 that the AE is proper, the system control circuit 50 stores the measurement data and/or the set parameters in the internal memory or the memory 52. The system control circuit 50 adjusts the parameters for coloring process using the image processing circuit 20 and provides the AWB control (S207), until determining that the AWB is proper using the operation result by the image processing circuit 20 and the measurement data obtained by the AE control (S206).

When determining that the AWB is proper (S206), the system control circuit 50 stores the measurement data and/or the set parameters in the internal memory or the memory 52. Using the measurement data obtained by the AE control and the AWB control, the system control circuit 50 provides the AF control (of driving of the focus lens) using the focus control circuit 42 until the imaging optical system is in the focused state (S208).

When determining that the imaging optical system is in the focused state in the step S208, the system control circuit 50 stores the measurement data and/or the set parameters in the internal memory or memory 52, and ends the focusing and photometry processes routine (S134 in FIG. 3).

Figure 4A:
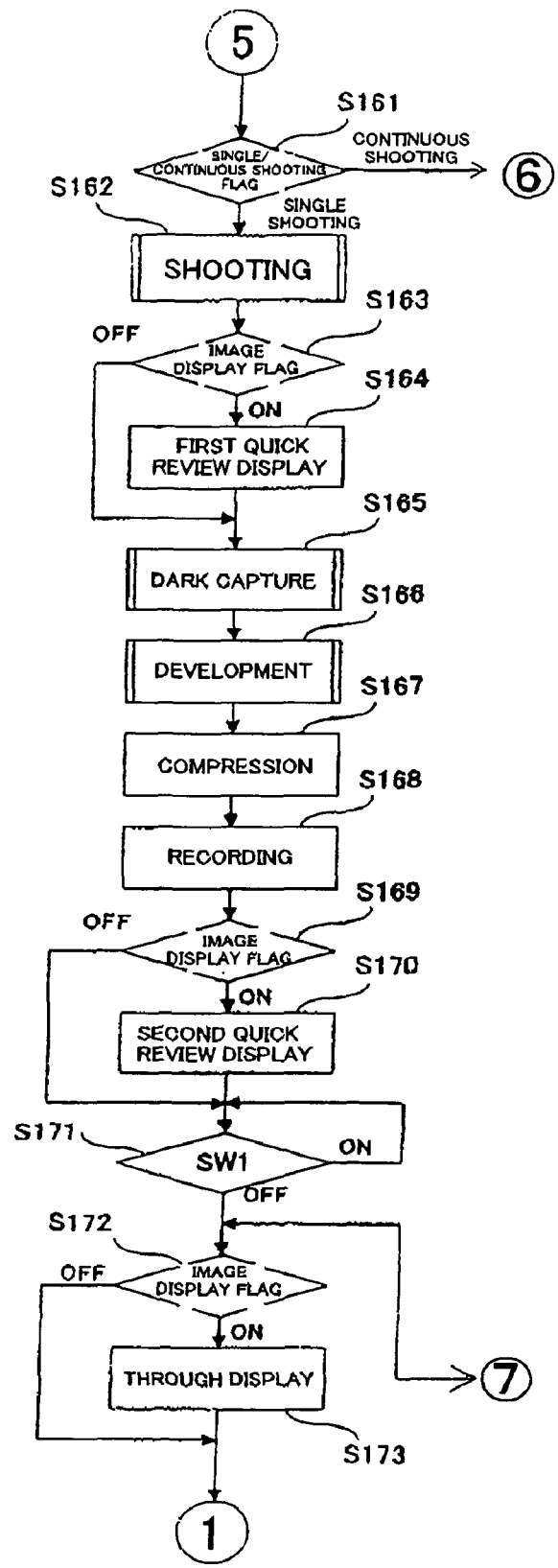
FIGS. 4A and 4B are flowcharts showing a main routine of the camera according to the first embodiment
Figure 4B:
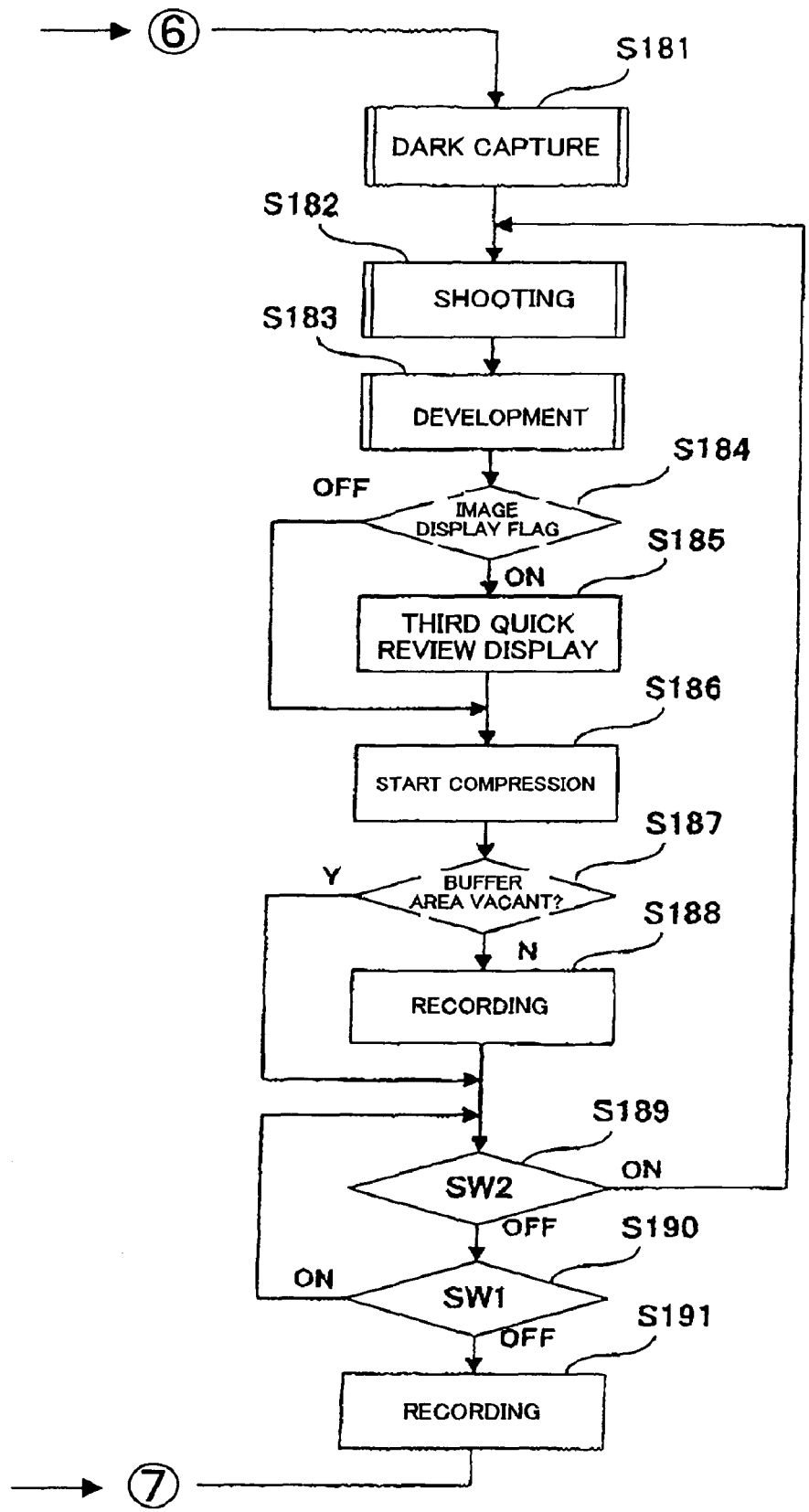
Figure 5:
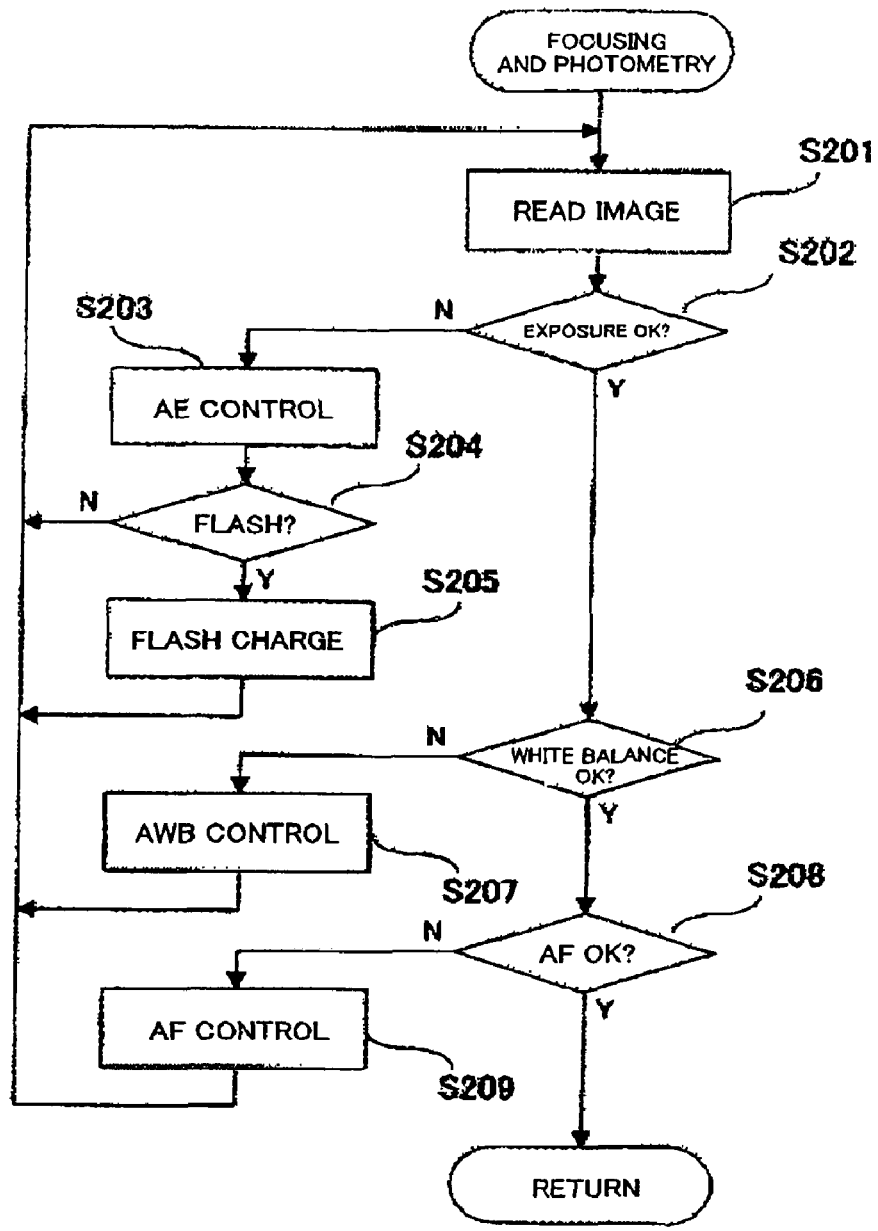
FIG. 5 is a flowchart showing a subroutine of focusing and photometric processes according to the first embodiment.
Figure 6:
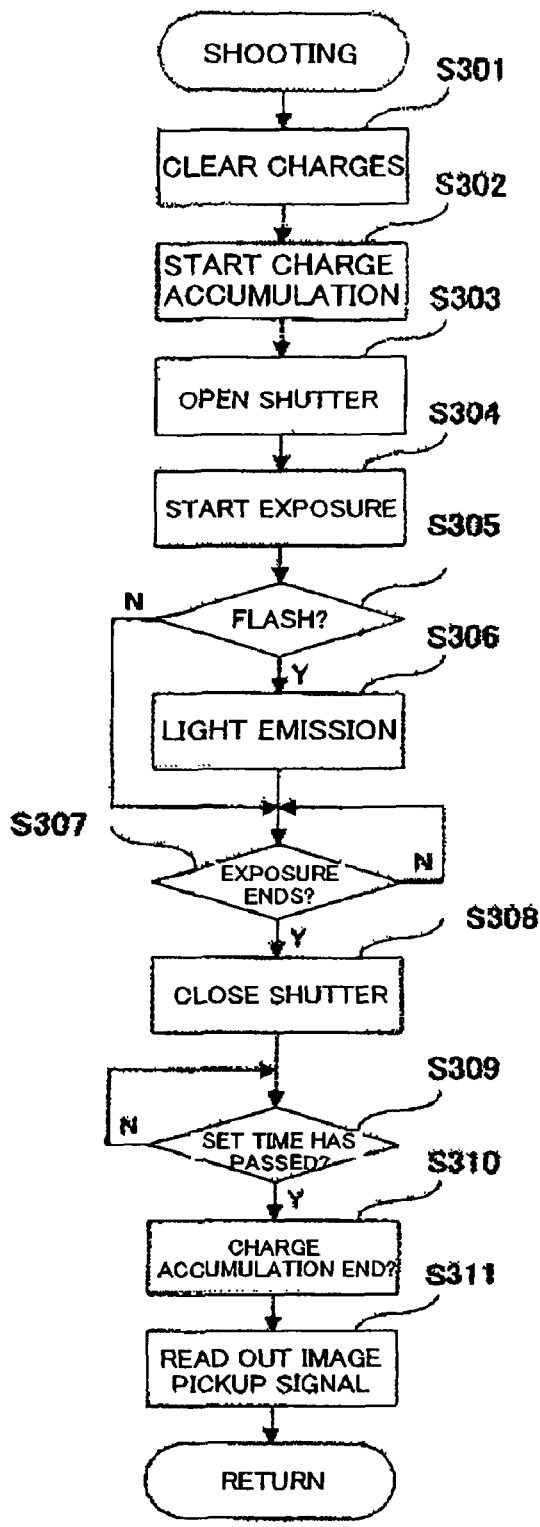
FIG. 6 is a flowchart showing a shooting process according to the first embodiment.

FIG. 6 is a detailed flowchart of the step 162 in FIG. 4A and the step 182 in FIG. 4B.

The system control circuit 50 starts accumulations of charges of the image pickup device 14 (S302), after clearing the charges in the image pickup device 14 (S301). The system control circuit 50 opens the shutter 12 by driving the shutter 12 via the exposure control circuit 40 (S303), and starts exposure to the image pickup device 14 (S304).

The system control circuit 50 determines based on the set state of the flash flag whether or not the flash unit 404 should emit (S305). When determining that the flash unit 404 should emit, the system control circuit 50 moves to a step 306. When determining that the flash unit 404 does not have to emit, the system control circuit 50 moves to a step 307.

The step 306 emits the flash unit 404 via the flash control circuit 48.

The system control circuit 50 waits for a completion of the exposure of the image pickup device 14 based on the photometric data (shutter speed) in the photometric process (S307), and closes the shutter 12 via the exposure control circuit 40 (S308), thereby terminating the exposure of the image pickup device 14.

The system control circuit 50 waits until the set charge accumulation time period elapses (S309), and ends the charge accumulation of the image device 14 when it elapses (S310). The system control circuit 50 then reads the charge signal from the image pickup device 14, and writes the shot image data in the predetermined area in the memory 30 via the A/D converter 16, the image processing circuit 20, and the memory control circuit 22, or via the memory control circuit 22 directly from the A/D converter 16 (S311).

After the above series of processes, the shooting process routine (S162 or S182) ends.

Figure 7:
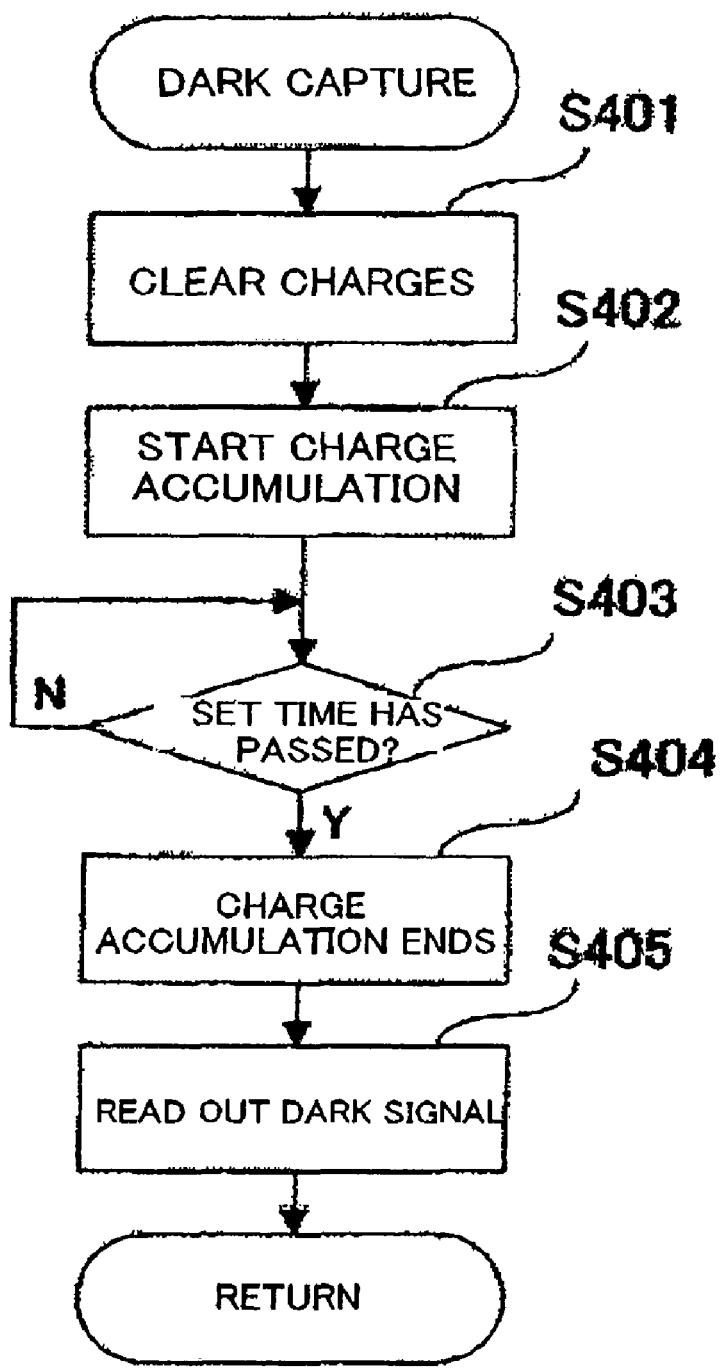
FIG. 7 is a flowchart showing a subroutine of a dark capture process according to the first embodiment.

FIG. 7 is a detailed flowchart of the dark capture process in the steps 165 and 181 in FIG. 4.

The system control circuit 50 starts accumulations of charges of the image pickup device 14 (S402) while closing the shutter 12, after clearing the charges in the image pickup device 14 (S401).

The system control circuit 50 ends the charge accumulation of the image device 14 (S404) when the predetermined charge accumulation time period elapses (S403). The system control circuit 50 then reads the charge signal from the image pickup device 14, and writes the (dark) image data in the predetermined area in the memory 30 via the A/D converter 16, the image processing circuit 20, and the memory control circuit 22, or via the memory control circuit 22 directly from the A/D converter 16 (S405).

The shot image data is protected from the deterioration of the image quality, such as loss of pixels due to dark current noises generated in the image pickup device 14 and scratches in the image pickup device 14 through the development using the dark image data as discussed above.

The dark image data is held in the predetermined area in the memory 30 until a new dark capture process is conducted or the camera 100 is powered off. When part or all of the memory 30 includes a nonvolatile memory such as an EEPROM and a hard disc drive, the dark image data is written in the predetermined area in the nonvolatile memory, until the new dark capture process is conducted.

The dark image data stored in the memory 30 is used for the development of the image data read out of the image pickup device 14. The dark capture process routine (S165 or S181) ends after the above series of processes.

Figure 8:
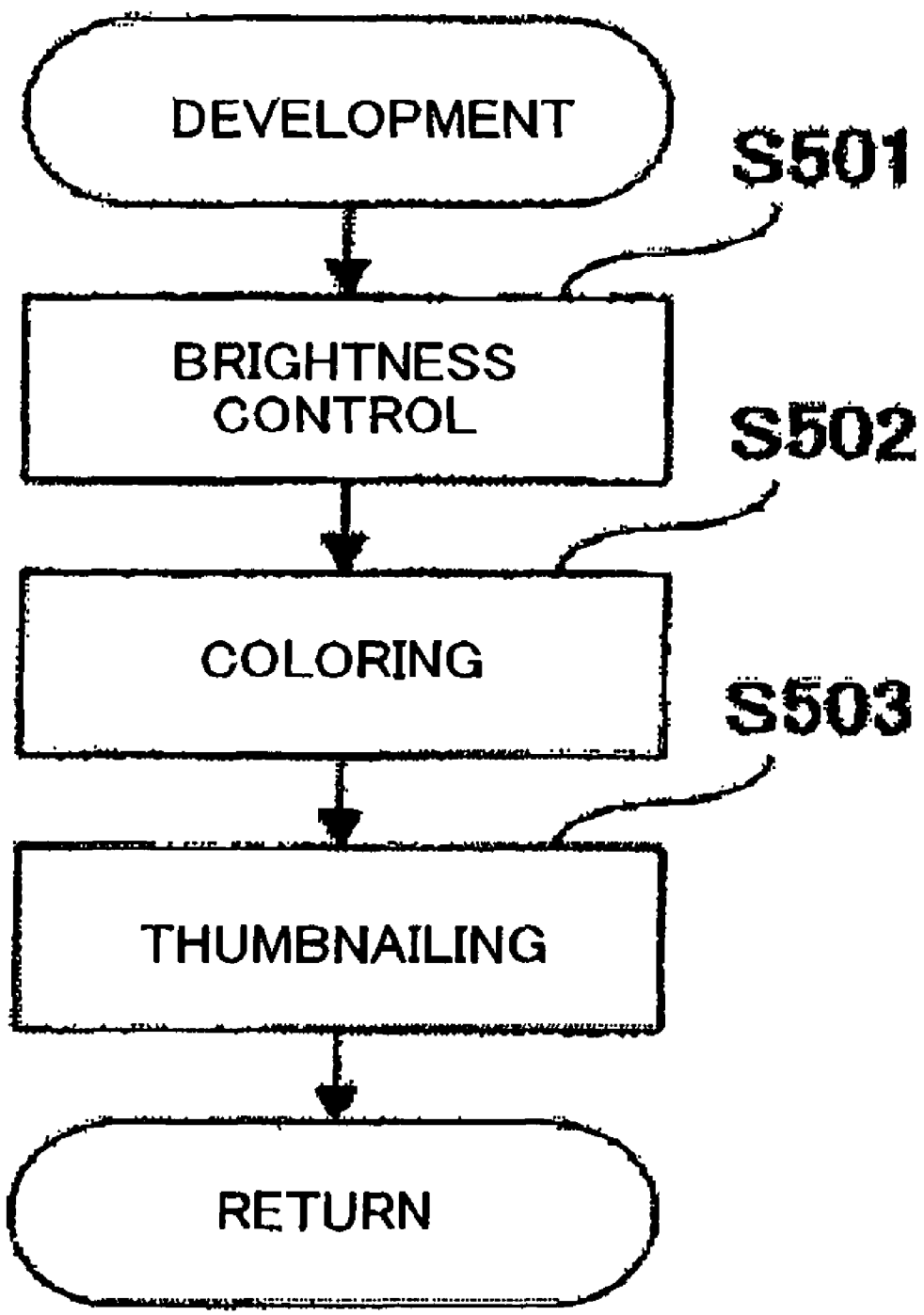
FIG. 8 is a flowchart showing a subroutine of a development according to the first embodiment.

FIG. 8 is a detailed flowchart of the development in the step 166 in FIG. 4A and the step 183 in FIG. 4B.

The system control circuit 50 reads the shot image data and the dark image data written in the memory 30, sequentially performs a known brightness signal process (S501), a coloring process (S502), and a thumbnail image process (S503), and writes the processed image data in the memory 30.

Figure 9:
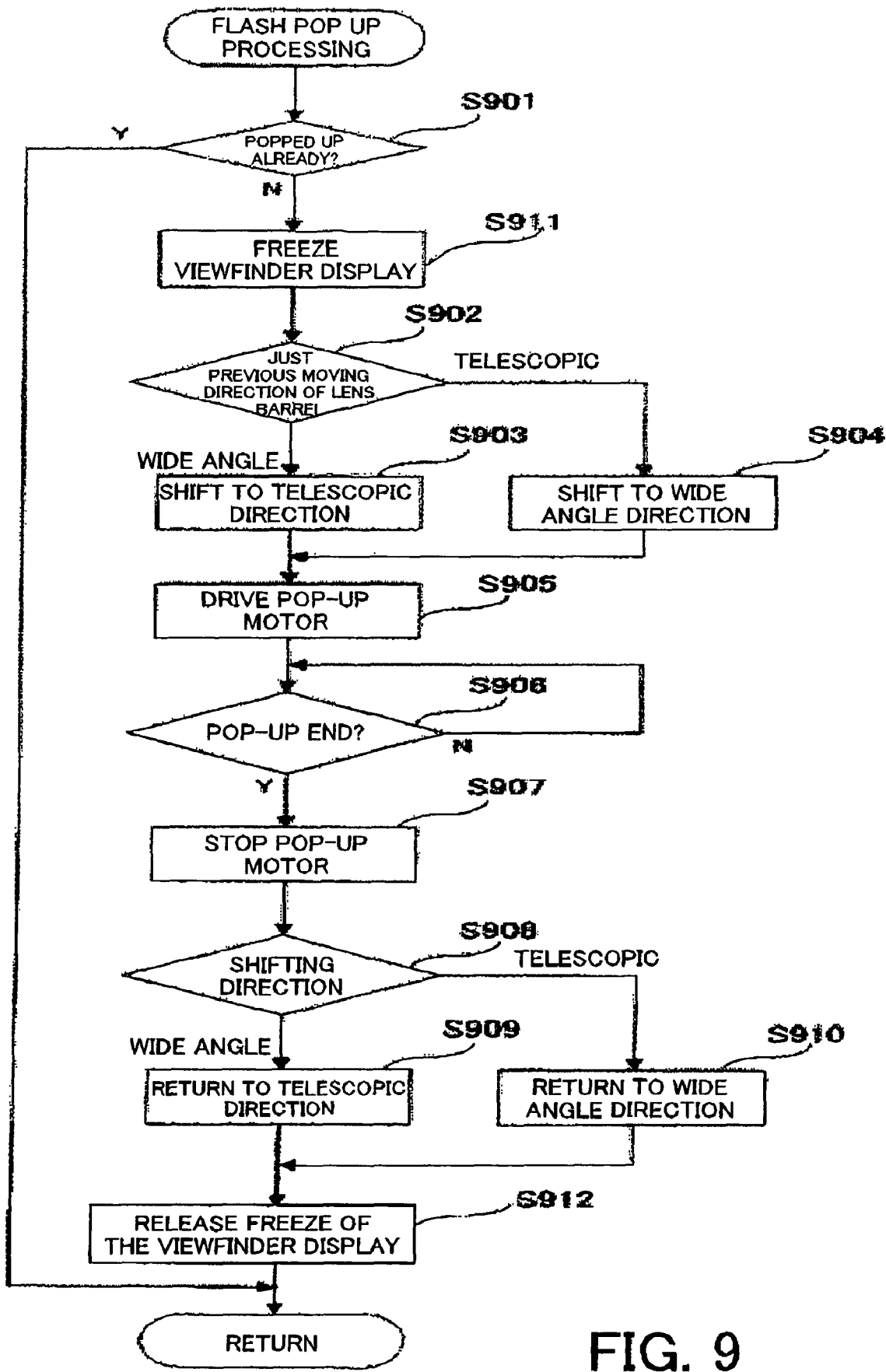
FIG. 9 is a flowchart showing a subroutine of a flash pop-up process according to the first embodiment.
Figure 10A:
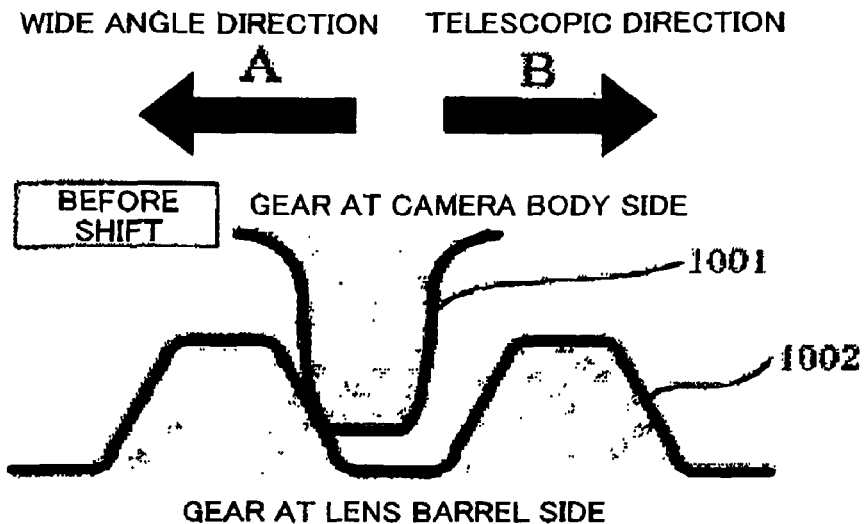
FIGS. 10A-C are partial enlarged views of a driving force transmission in the camera according to the first embodiment.
Figure 10B:
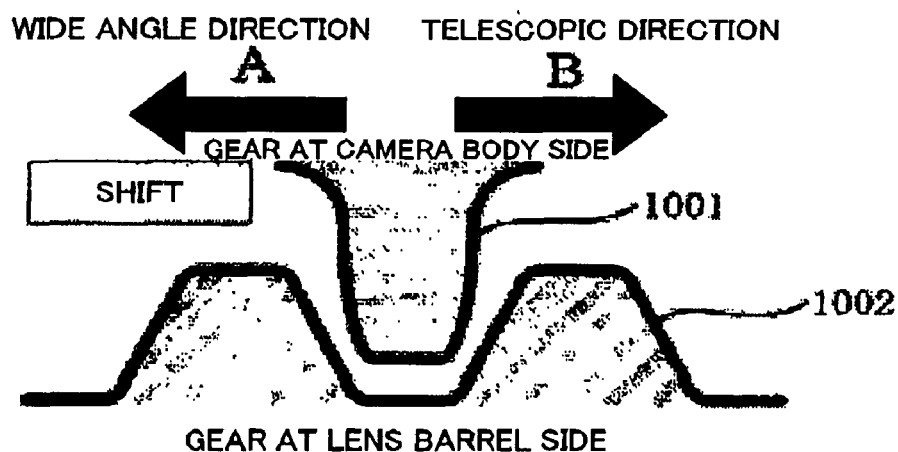
Figure 10C:
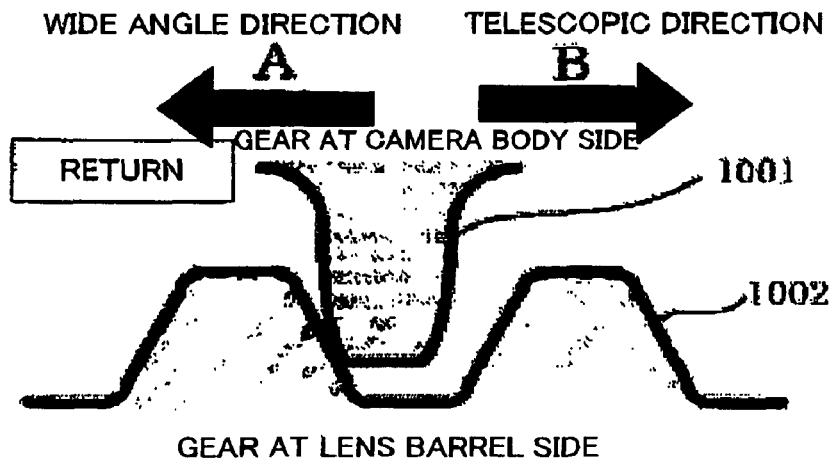

FIG. 9 is a detailed flowchart of the flash pop-up process in the step 136 in FIG. 3A. FIG. 10-C is a partial enlarged view of the driving force transmissions 42b and 44b that transmit driving forces of the focus driving motor 42a and zoom driving motor 44a (collectively referred to as "the lens driving motor" hereinafter) to the focus lens and the zoom lens (collectively referred to as "the image pickup lens 10" hereinafter). In other words, FIG. 10A-C are enlarged view between the slip 511 and the final gear 512 and between the final gear 512 and the gear member 520a in the cam cylinder 520 in FIG. 13.

A gear 1001 in FIG. 10A-C corresponds to one of the above two gears which is located at the camera body side, i.e., the slip 511 and the final gear 512. A gear 1002 corresponds to one of the above two gears which is located at the lens barrel side, i.e., the final gear 512 or the gear 520a in the cam cylinder 520.

The image pickup lens 10 of this embodiment receives the driving force of the lens driving motor (or the actuator) in the camera body 100 via the driving force transmission (drive mechanism) and moves along the optical-axis direction.

In a step 901 in FIG. 9, the system control circuit 50 (controller) determines whether the flash unit 404 (light emitting unit) has popped up to the light emitting position, based on the output of the flash position sensor 403. When the flash unit 404 has popped up, the flash pop-up process ends.

On the other hand, when the flash unit 404 has not popped up, the procedure moves to a step 911 so as to freeze the viewfinder display. As discussed above, the display state of the image display unit is turned to the freeze display state.

A step 902 determines a moving direction of the image pickup lens 10 before the image pickup lens 10 stops at the current position. When the image pickup lens 10 has moved to the wide-angle direction (which is one direction in the optical-axis direction) before it stops at the current position the procedure moves to a step 903, and when the image pickup lens 10 has moved to the telescopic direction (which is the other direction in the optical-axis direction), the procedure moves to a step 904.

In the step 903, the system control circuit 50 controls driving of the lens driving motor and rotates the lens driving motor in the direction in which the image pickup lens 10 moves in the telescopic side. In other words, the system control circuit 50 rotates the lens driving motor in a direction opposite to one in which the lens driving motor moves the image pickup lens 10 before the image pickup lens 10 stops at the current position.

As shown in FIG. 10A, when the lens driving motor rotates the gear 1001 at the side of the lens driving motor in the driving force transmission, in an arrow A direction, and moves the image pickup lens 10 in the wide-angle direction, the gear 1001 rotates in an arrow B direction by changing a rotating direction of the lens driving motor.

The system control circuit 50 controls driving of the lens driving motor so that the rotating amount of the gear 1001 falls within a backlash range of the gears 1001 and 1002 (or the mechanical insensitive state). Thereby, a relationship between the gear 1001 and 1002 becomes one shown in FIG. 10B (the second state).

In the state shown in FIG. 10B, the gears 1001 and 1002 do not contact each other, and the image pickup lens 10 substantially floats relative to the camera body 100. The gear 1001 rotates within the idling range of the gears 1001 and 1002 as discussed. Therefore, even when the gear 1001 rotates, the gear 1002 does not rotate or the image pickup lens 10 does not move.

Thereby, even when the camera body 100 side receives the vibration, only the gear 1001 rotates and the gear 1002 is prevented from rotations. Therefore, the vibration does not transmit to the image pickup lens 10 via the gears 1001 and 1002, and the image pickup lens 10 is prevented from shifting in the optical-axis direction.

On the other hand, in the step 904, the system control circuit 50 controls driving of the lens driving motor, and rotates the lens driving motor in the direction in which the image pickup lens 10 moves in the wide angle side. In other words, the system control circuit 50 rotates the lens driving motor in a direction opposite to one in which the lens driving motor moves the image pickup lens 10 before the image pickup lens 10 stops at the current position.

Thus, a relationship between the gears 1001 and 1002 is like the state shown in FIG. 10B, and the vibration is prevented from transmitting to the image pickup lens 10 via the gears 1001 and 1002. Therefore, the vibration applied to the camera body 100 is prevented from shifting a position of the image pickup lens 10.

A restraint of a positional offset of the image pickup lens 10 does not change a state of the optical viewfinder 104 that is (mechanically) associated with the movement of the image pickup lens 10 in the optical-axis direction, and can restrain the change of the angle of view in the optical viewfinder 104. Moreover, when the image display unit 28 is at the display state, a positional offset of the image pickup lens 10 can restrain a change of the display (or the angle of view) on the image display unit 28.

In a step 905 in FIG. 9, the system control circuit 50 instructs the flash control circuit 48 to pop up the flash unit 404 to the light emitting position. Thereby, the flash control circuit 48 drives the pop-up motor 402 and pops up the flash unit 404 to the light emitting position (S905).

In a step 906, the flash control circuit 48 determines, based on an output of the flash position sensor 403, whether the flash unit 404 has moved to the light emitting position. When it has moved to the light emitting position, the flash control circuit 48 stops driving the pop-up motor 402. On the other hand, when the flash unit 404 has not moved to the light emitting position, the flash control circuit 48 continues to drive the pop-up motor 402, until the flash unit 404 moves to the light emitting position.

This embodiment pops up the flash unit 404 while maintaining a disengagement between the gears 1001 and 1002 as shown in FIG. 10B, and prevents the vibration that occurs in the camera body during pop-up time, from transmitting to the image pickup lens 10. Thereby, a positional offset, a defocus and a variance of the shooting angle of view of the image pickup lens 10 can be prevented.

In a step 908 in FIG. 9, the system control circuit 50 determines a rotating direction of the gear 1001 before the pop-up of the flash unit 404 or a rotational direction of the lens driving motor. When the lens driving motor has rotated to move the image pickup lens 10 in the wide-angle direction, the lens driving motor is rotated so as to move the image pickup lens 10 in the telescopic direction (S909).

Thereby, the gear 1001 in the state shown in FIG. 10B can be returned to a (first) state shown in FIG. 10C in which the gear 1001 has not rotated relative to the gear 1002 and both gears 1001 and 1002 contact each other. The driving amount of the lens driving motor is set approximately equal to the driving amount of the above step 903. Thereby, the image pickup lens 10 is movable in the optical-axis direction by the driving force from the lens driving motor via the driving force transmission.

On the other hand, when the lens driving motor has rotated to move the image pickup lens 10 in the telescopic direction, the lens driving motor is rotated so as to move the image pickup lens 10 in the wide-angle direction (S910). Even in this case, the driving amount of the lens driving motor is set approximately equal to the driving amount of the above step 904, and the gear 1001 can be returned to the state where the gear 1001 has not rotated relative to the gear 1002.

Then, the image display unit 28 is released from the freeze display state (S912), and the flash pop-up process ends.

The above series of processes can prevent the focus lens that is located at a focusing position from offsetting due to the vibrations caused by the pop-up action of the flash unit 404. In additions as discussed above, this embodiment prevents not only the zoom lens from offsetting in the optical-axis direction, but also the angle of view from changing at each of the associative optical viewfinder 104 and the image display unit 28.

Second Embodiment

Figure 11:
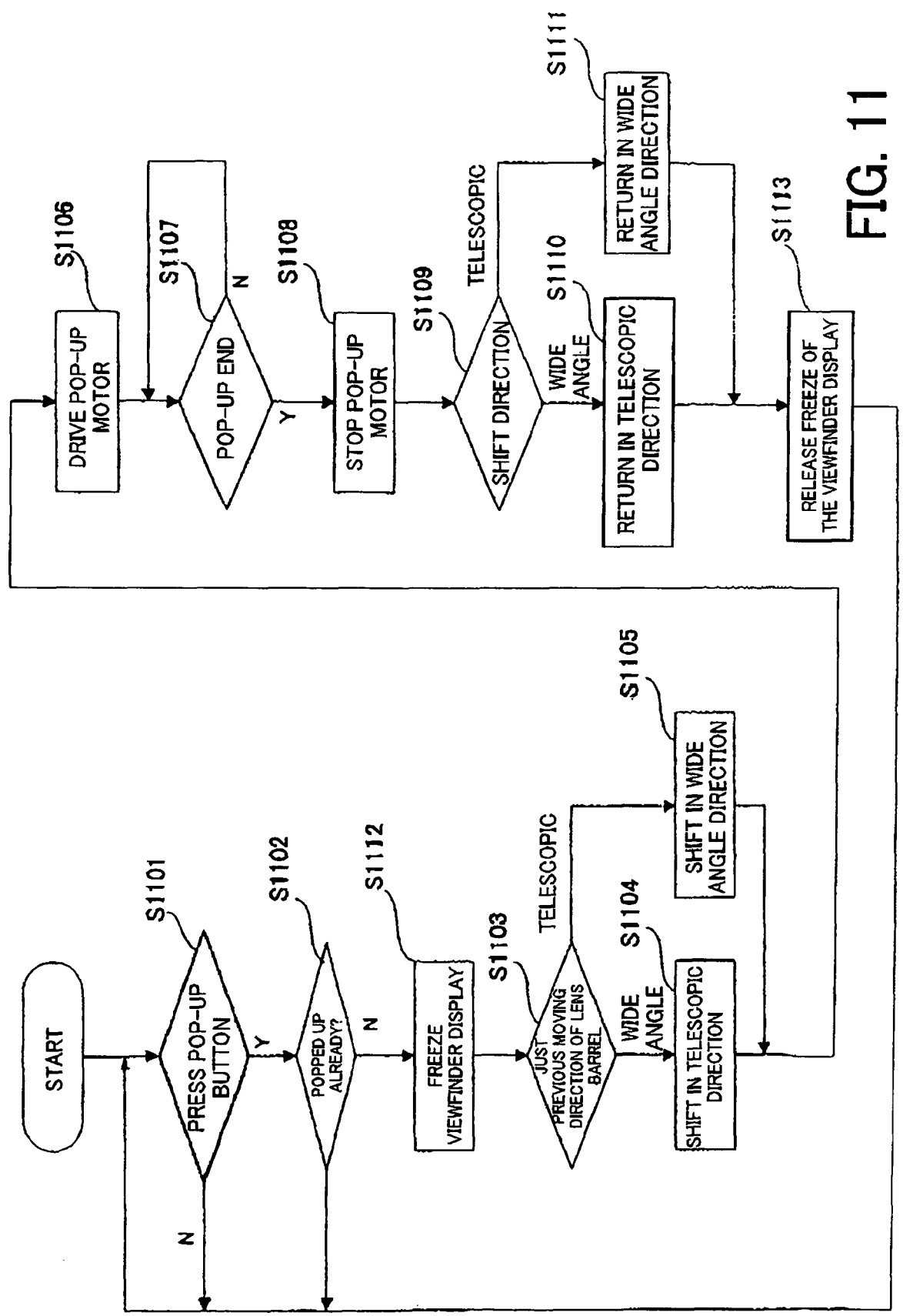
FIG. 11 is a flowchart showing a subroutine of a flash pop-up process in a camera according to a second embodiment.
Figure 12:
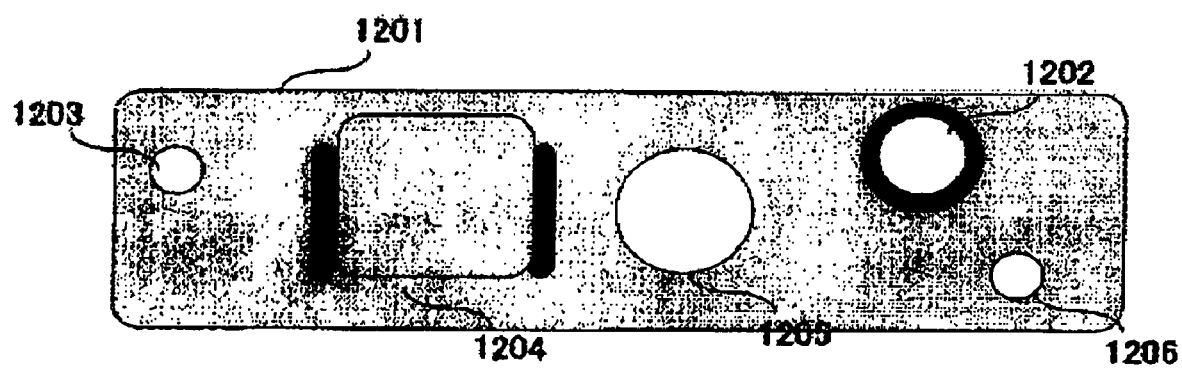
FIG. 12 is a top view of the camera according to the second embodiment.

Referring now to FIGS. 11 and 12, a description will be given of a camera according to a second embodiment of the present invention. FIG. 11 shows a sequence to pop up the flash unit by a manipulation of a pop-up button after the power is projected in the camera of the present invention. FIG. 12 is a top view of the camera of the present invention.

In FIG. 12, 1201 denotes a camera body. 1202 denotes a release button, which starts a shooting preparation in response to the semi-press, and starts a shooting action in response to the full press. 1203 denotes a pop-up button. A manipulation of this button can move or pop up the flash unit that is located at a housed position to the light emitting position.

1204 denotes a flash unit that irradiates the illumination light onto a subject, and is movable between the accommodation position housed in the camera body 1201 and the light emitting position projecting from the camera body 1201. 1205 denotes a mode dial operated so as to set the shooting mode, etc., and 1206 denotes a power button of the camera. Other components in the camera of this embodiment are similar to those in the camera of the first embodiment, and designated by the same reference numerals as those in the camera of the first embodiment.

In a step 1101 in FIG. 11, the system control circuit 50 stands by until the pop-up button 1203 is manipulated. The system control circuit 50 moves to the step 1102 when the pop-up button 1203 is manipulated, and determines whether or not the flash unit 1204 has popped up.

In other words, the system control circuit 50 receives the output of the flash position sensor 403 via the flash control circuit 48, and determines based on this output whether the flash unit 1204 has already popped up. When the flash unit 1204 has already popped up, the procedure moves to the step 1101.

On the other hand, when the flash unit 1204 has not yet popped up, the procedure moves to the step 1112, and turns the display state of the image display unit 28 to the freeze display state.

Next, in a step 1103, the system control circuit 50 determines a moving direction of the image pickup lens 10 before the image pickup lens 10 stops at the current position. When the image pickup lens 10 has moved in the wide-angle direction, the procedure moves to a step 1104, and when the image pickup lens 10 has moved in the telescopic direction, the procedure moves to a step 1105.

In the step 1104, the lens driving motor is driven so as to move the image pickup lens 10 in the telescopic direction. In the step 1105, the lens driving motor is driven so as to move the image pickup lens 10 in the wide-angle direction.

Similar to the first embodiment, the driving direction of the lens driving motor is set to rotate the gear at the lens driving motor side relative to the gear at the image pickup lens among two gears in the driving force transmission that transmits the driving force of the lens driving motor to the image pickup lens 10, by an idling portion of the gear side so as to maintain the disengagement between the above two gears. The disengagement state between these two gears prevents the vibration from transmitting to the image pickup lens 10 even when the vibration is applied to the lens driving motor or the camera body.

Even when the gear at the lens driving motor side is rotated as discussed above, this gear does not contact the gear at the side of the image pickup lens 10, the gear at the side of the image pickup lens does not rotate, or the image pickup lens 10 does not move.

In a step 1106, the system control circuit 50 instructs the flash control circuit 48 to pop up the flash unit 1204. Thereby, the flash control circuit 48 drives the pop-up motor 402, and pops up the flash unit 1204.

In a step 1107, the flash control circuit 48 determines based on the output of the flash position sensor 403 whether the flash unit 1204 is located at the light emitting position. When the flash unit 1204 is located at the light emitting positions the flash control circuit 48 stops driving of the pop-up motor 402. When the flash unit 1204 is not located at the light emitting position, the flash control circuit 48 drives the pop-up motor 402 until the flash unit 1204 moves to the light emitting position (S1108).

In a step 1109, the system control circuit 50 determines the driving direction just before the flash unit 1204 pops up. When the lens driving motor is driven so as to move the image lens 10 in the wide-angle direction, the procedure moves to the step 1110; when the lens driving motor is driven so as to move the image lens 10 in the telescopic direction, the procedure moves to the step 1111.

A step 1110 drives the lens driving motor so as to move the image pickup lens 10 in the telescopic direction, and a step 1111 drives the lens driving motor so as to move the image pickup lens 10 in the wide-angle direction. The driving amount of the lens driving motor is approximately equal to those in the steps 1104 and 1105. Thereby, the gear at the side of the lens driving motor side contacts the gear at the side of the image pickup lens, and only the gear at the side of the lens driving motor can be returned to the pre-rotation state.

Then, the image display unit 28 is released from the freeze display state (S1113).

The above series of actions protect the image pickup lens 10 from the impact influence caused by the pop-up action of the flash unit 1204 or defocusing. Since the image pickup lens 10 (zoom lens) does not offset from a predetermined zoom position, the optical viewfinder 104 associated with the image pickup lens 10 and the image display unit 28 are prevented from changing the angle of view.

Third Embodiment

A description will now be given of an operation of a camera according to a third embodiment of the present invention. In this embodiment, the structure of the camera shown in FIG. 1 and the flowcharts shown In FIGS. 2A, 2B, 4A, 4B 6 to 8 are similar to the first embodiment, and a description thereof will be omitted. Only the different part from the first embodiment will be mainly discussed. Those elements common to the first embodiment are designated by the same reference numerals as those in the first embodiment.

Figure 15:
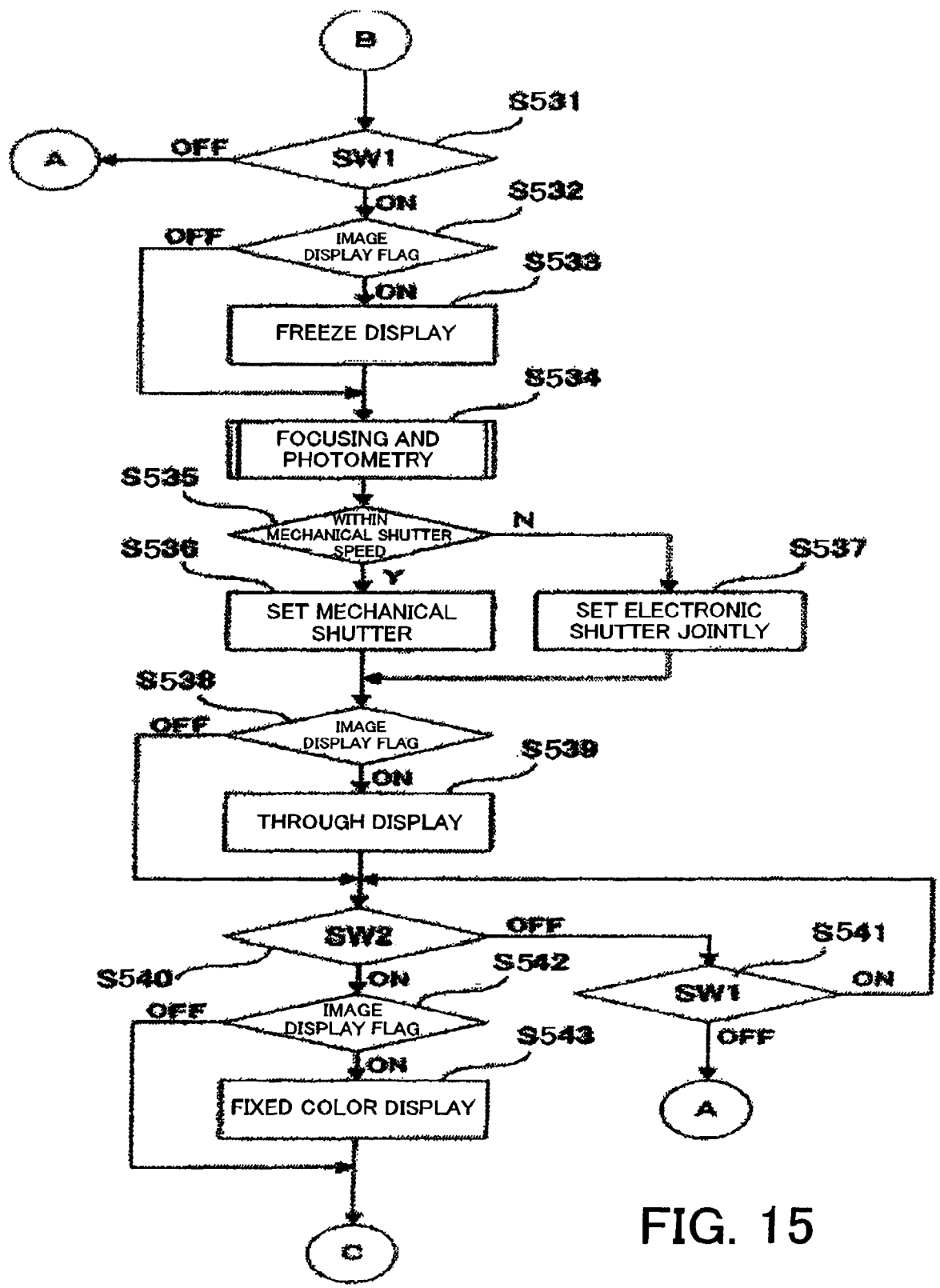
FIG. 15 is a flowchart showing a main routine of a camera according to a third embodiment of the present invention.

FIG. 15 shows part of the flowchart of a main routine of the camera according to this embodiment. This flowchart supersedes those in FIGS. 3A and 3B in the first embodiment.

In a step 531, the system control circuit 50 determines the ON/OFF state of the shutter switch 62 (SW1). When it is in the OFF state, the procedure returns to the step 103 in FIG. 2A. When the shutter switch 62 (SW1) is in the ON state (S531), the system control circuit 50 determines the state of the image display flag stored in the internal memory or the memory 52 (S532).

When the image display flag is set, the display state of the image display unit 28 is set to the freeze display state (S533) and the procedure moves to the step 534.

In the freeze display state, the image display memory 24 is prohibited from rewriting the image data via the image pickup device 14, the A/D converter 16, the image processing circuit 20, and the memory control circuit 22. The image data that is finally written in the image display memory 24 is output to the image display unit 28 via the memory control circuit 22 and the D/A converter 26, and displayed on the image display unit 28. Thereby, the image display unit 28 displays the frozen image.

On the other hand, when the image display flag is released in the step 132, the procedure moves to the step 534.

The system control circuit 50 moves the focus lens to the focusing position by the focusing action, and determines the stop value and the shutter speed by the photometry action (S534). The system control unit 50 when determining that the flash unit 404 should be used based on the photometric result, sets the flash. A detailed description will be given of the above focusing and photometric actions, with reference to FIG. 16.

In a step 535, the system control circuit 50 determines whether the shutter speed determined based on the shooting mode set by an operation of the mode dial 60 and the exposure result obtained by the photometric action (S534) exceeds the maximum shutter speed in the (mechanical) shutter 12.

When it does not exceed the maximum shutter speed, the shutter speed in the shutter 12 is set (S536), and the procedure moves to a step 538. On the other hand, when it exceeds the maximum shutter speed, the shutter speed is set by using diving of the shutter 12 and the electronic shutter (driving of the image pickup device 14) (S537), and the procedure moves to a step 538.

When the shooting shutter speed exceeds the maximum (mechanical) shutter 12, the parallel use of the electronic shutter can prevent smears by the mechanical shutter, and the electronic shutter can maintain a high-speed shutter speed.

The system control circuit 50 determines a state of the image display flag in the memory in the system control circuit 50 or in the memory 52 (S538), and sets the display state of the image display unit 28 to the through display state when the image display flag is set (S539), the procedure moves to a step 540.

The step 540 determines the ON/OFF state of the shutter switch 64 (SW2). When the shutter switch 64 is in the OFF state, the system control circuit 50 determines the ON/OFF state of the shutter switch 62 (SW1) again, and when SW1 is in the OFF state, the procedure returns to the step 103 in FIG. 2A. When SW1 is in the ON state, the procedure returns to the step 540.

When determining that the shutter switch 64 (SW2) is in the ON state (S540), the system control circuit 50 determines a state of the image display flag in the memory in the system control circuit 50 or in the memory 52 (S542), and sets the display state of the image display unit 28 to the fixed color display state when the image display flag is set (S543), the procedure moves to the step 161. When the image display flag is not set, the procedure moves to the step 161 in FIG. 4A.

In the fixed color display state, the fixed color image data is output to the image display unit 28 via the memory control circuit 22 and the D/A converter 26, instead of the image data written down in the image display memory 24 via the image pickup device 14, the A/D converter 16, the image processing circuit 20, and the memory control circuit 22. Thereby, the image display unit 28 displays the fixed color image data.

Figure 16:
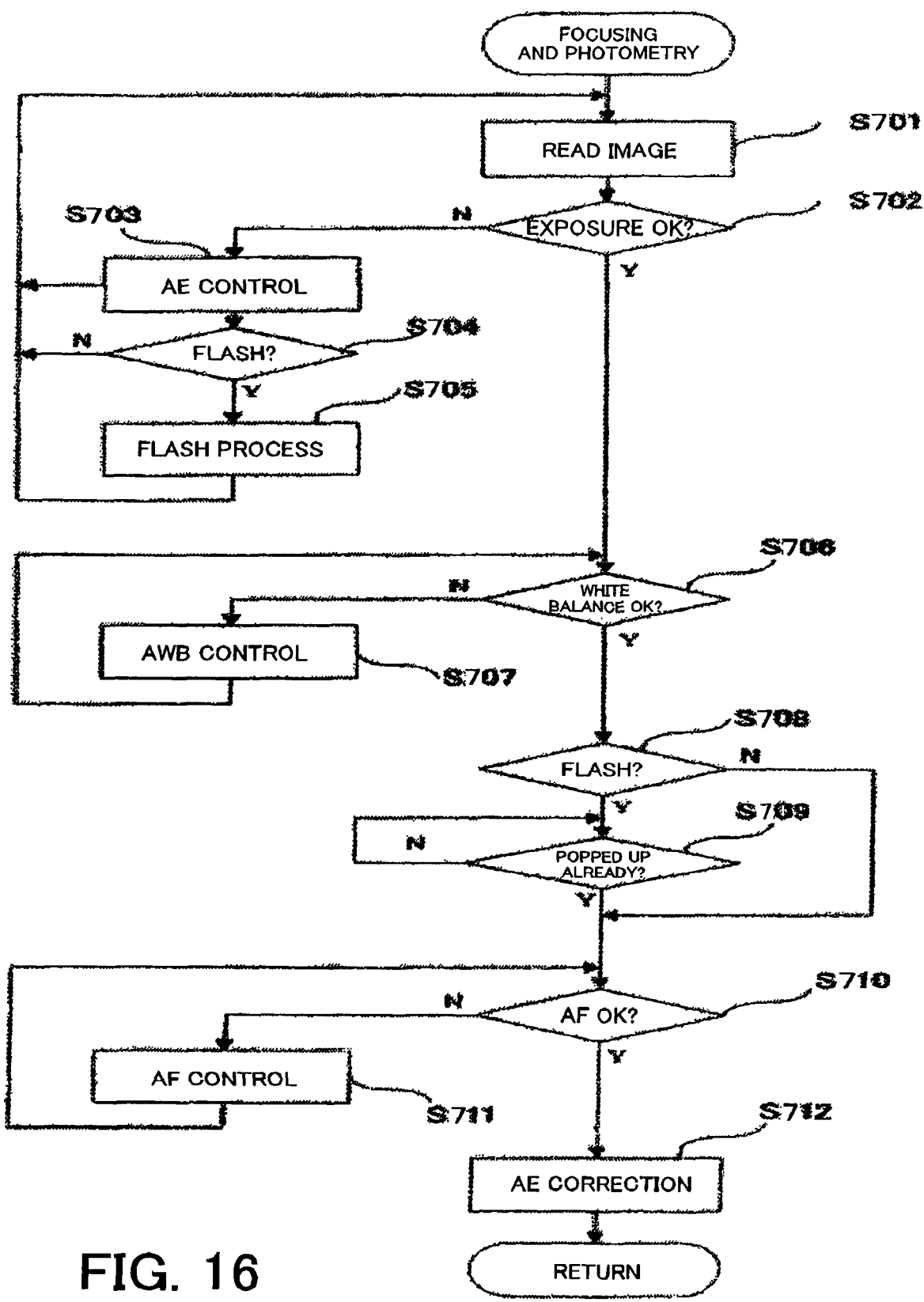
FIG. 16 is a flowchart showing a main routine of the camera according to the third embodiment.

FIG. 16 shows a detailed flowchart of the focusing and photometry processes in the step 534 in FIG. 15.

A step 701 reads a charge accumulation signal (image data) from the image pickup device 14, and the image processing circuit 20 sequentially reads the image data via the A/D converter 16. The image processing circuit conducts a predetermined operation used for the TTL AE, EF and AF processes using this sequentially read image data.

Each process cuts a necessary number of pixels of a specific part in accordance with the necessity among all the shot pixels, and extracts it for use with the operation. Thereby, an optimal operation is available for each of the AE, EF, AWB and AF processes and each of different modes including a center emphasized mode, an averaging mode, and an evaluation mode.

Until the system control circuit 50 determines that the AE is proper using the operating result at the image processing circuit 20 (S702), the system control circuit 50 provides the AE control (driving control of the stop) using the exposure control circuit 40 (S703). The system control circuit 50 determines whether the flash unit 404 should emit or not using the measurement data obtained in the AE control (S704).

When the emission of the flash unit 404 is necessary, the system control circuit 50 sets a flash flag and instructs the flash control circuit 48 to charge the flash unit 404 (S705). Thereby, the flash unit 404 is charged for emission.

The system control circuit 50 determines based on the output from the flash position sensor 403 whether the flash unit 404 has popped up to the light emitting position. When the flash unit 404 has already popped up, the flash process ends.

On the other hand, when the flash unit 404 has not yet popped up, the system control circuit 50 instructs the flash control circuit 48 to pop-up the flash unit 404 to the light emitting position. The flash control circuit 48 drives the pop-up motor 402, and pops up the flash unit 404 that is located at the accommodation position, to the light emitting position.

The flash control circuit 48 determines based on the output from the flash position sensor 403 whether the flash unit 404 has moved to the light emitting position, and stops the pop-up motor 402 when it has moved to the light emitting position. On the other hand, when the flash unit 404 has not yet moved to the light emitting position, the flash control circuit 48 continues to drive the pop-up motor 402 until the flash unit 404 moves to the light emitting position.

When determining in the step 702 that the AE is proper, the system control circuit 50 stores the measurement data and/or the set parameters in the internal memory or the memory 52.

The system control circuit 50 adjusts the parameters for coloring process using the image processing circuit 20 and provides the AWB control (S707), until determining that the AWB is proper using the operational result at the image processing circuit 20 and the measurement data obtained by the AE control (S706).

When determining that the AWB is proper (S706), the system control circuit 50 stores the measurement data and/or the set parameters in the internal memory or the memory 52.

In a step 504, when the flash flag is set (S708), the system control circuit 50 waits for the completion of the flash pop-up action (S709). When determining that this requires the flash (or the emission of the flash unit 404) in the step 704, the system control circuit 50 instructs the flash control circuit 48 to charge in the step 705. Parallel to the flash emission preparation process, when determining that the AWB is proper in the step 706 and the flash unit 404 has not yet popped up, the system control circuit 50 properly controls the AF in the step 710 by waiting for the completion of the popping up of the flash unit 404.

In a step 710, the system control circuit 50 determines using the measurement data and/or the set parameters in the internal memory or the memory 52 whether the imaging optical system is in the focused state. When it is in the focused state, the procedure moves to the step 512, and when it is not the procedure moves to the step 711. In the step 711, the system control circuit 50 controls the AF (or driving of the focus lens) by using the focus control circuit 42. More specifically, the focus control circuit 42 is provided in the camera body 100 (lens barrel), and the AF is controlled by driving the driving force transmission 42b that drives the focus lens in the optical-axis direction.

When the imaging optical system is in the focused state in the step 710, the measurement data and/or the set parameter are stored in the memory in the system control circuit 50 or the memory 52.

In the step 712, the AF correction process follows using the measurement data obtained from the focused state of the imaging optical system. The system control circuit 50 then ends the focusing and photometry processes routine.

When the flash unit 404 pops up after focusing, the vibration that occurs in the camera body 100 at the pop-up time might possibly offset the image pickup lens (or focus lens) 10 from the focused position. However, the camera according to this embodiment pops up the flash unit 404 prior to the focusing action when the flash unit 404 should be emitted as discussed above. In other words, the image pickup lens (focus lens) 10 is driven after the flash unit 404 pops up.

This configuration prevents the vibration that occurs at the pop-up time of the flash unit 404, from shifting the focused position of the image pickup lens (focus lens) 10.

While each of the above embodiments discusses a lens integrated camera, the present invention is applicable to a camera system that includes a camera and an interchangeable lens attached to the camera. In this case, the image pickup lens 10, the lens driving motor and the driving force transmission may be provided at the interchangeable lens side, whereas the system control circuit that controls the lens driving motor may be provided at the camera body side.

Of course, the present invention is applicable to an optical apparatus in addition to the camera.

This application claims a foreign priority based on Japanese Patent Applications Nos. 2004-032642 and 2004-032231, both filed on Feb. 9, 2004, and each of which is hereby incorporated by reference herein.

What is claimed is:

1. A control unit for an optical apparatus that includes a lens member that is movable, and an actuator, said control unit comprising:

a drive mechanism that is changeable between a first state at which the drive mechanism is capable of transmitting a driving force of the actuator to the lens member through a mechanical connection and a second state at which the drive mechanism is incapable of transmitting the driving force to the lens member by releasing the mechanical connection, a determination part configured to determine whether or not a movable member provided to the optical apparatus or to an apparatus attached to the optical apparatus is to pop up, a pop-up of the movable member giving a vibration impact to the optical apparatus; and a controller configured to control, prior to the pop-up of the movable member, the actuator so that the drive mechanism is changed from the first state to the second state to prevent the lens member from being moved by the vibration impact given by the pop-up of the movable member, when said determination part determines that the movable member is to pop up, wherein the actuator is driven in a direction opposite to a direction in which the actuator has driven immediately before the lens member was stopped at a current position, when the drive mechanism is changed from the first state to the second state.

2. A control unit according to claim 1, wherein said second state is a mechanically insensitive state in the drive mechanism.

3. A control unit according to claim 1, wherein the movable member is a light emitting unit.

4. An optical apparatus comprising a control unit according to claim 1.

5. An image pickup apparatus comprising:

a control unit according to claim 1; and an image pickup device that photoelectrically converts a subject image.

6. An image pickup apparatus according to claim 5, further comprising a display that displays image data obtained from said image pickup device, wherein said controller changes a display state of said display in accordance with whether or not the movable member is to pop up.

7. An image pickup apparatus according to claim 6, wherein said controller prohibits a change of the image data which said display displays in the pop-up of the movable member.

\* \* \* \* \*